(12) United States Patent
Kuretake

(10) Patent No.: US 12,017,497 B2
(45) Date of Patent: Jun. 25, 2024

(54) VEHICLE CONTROL DEVICE

(71) Applicant: TOYOTA JIDOSHA KABUSHIKI KAISHA, Aichi-ken (JP)

(72) Inventor: Ken Kuretake, Mishima (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 232 days.

(21) Appl. No.: 17/694,678

(22) Filed: Mar. 15, 2022

(65) Prior Publication Data
US 2022/0314725 A1    Oct. 6, 2022

(30) Foreign Application Priority Data
Apr. 2, 2021  (JP) .................................. 2021-063344

(51) Int. Cl.
*B60G 17/0195* (2006.01)
*B60G 17/016* (2006.01)
(Continued)

(52) U.S. Cl.
CPC ..... *B60G 17/0195* (2013.01); *B60G 17/0164* (2013.01); *B60N 2/4207* (2013.01); *B60N 2/427* (2013.01); *B60N 2/501* (2013.01); *B60N 2/505* (2013.01); *B60G 2400/106* (2013.01); *B60G 2400/204* (2013.01); *B60G 2400/40* (2013.01); *B60G 2500/10* (2013.01);
(Continued)

(58) Field of Classification Search
CPC ............ B60G 17/0195; B60G 17/0164; B60G 2400/106; B60G 2400/204; B60G 2400/40; B60G 2500/10; B60G 2500/22; B60N 2/4207; B60N 2/427; B60N 2/501; B60N 2/505; B60W 60/005; B60L 7/10

USPC ........................................................... 701/37
See application file for complete search history.

(56) References Cited

U.S. PATENT DOCUMENTS

| 5,169,112 A | * | 12/1992 | Boyles | ................... | B60N 2/508 248/421 |
| 5,652,704 A | * | 7/1997 | Catanzarite | ............ | B60N 2/501 248/550 |

(Continued)

FOREIGN PATENT DOCUMENTS

| JP | S638009 A | 1/1988 |
| JP | H04-303007 A | 10/1992 |
| JP | H07-117711 A | 5/1995 |

*Primary Examiner* — Logan M Kraft
*Assistant Examiner* — John D Bailey
(74) *Attorney, Agent, or Firm* — HAUPTMAN HAM, LLP

(57) ABSTRACT

A control device controls a vehicle including a seat suspension which is provided between a chassis and a seat of the vehicle and restricts vibration and of which each of a spring constant and a damping coefficient is changeable and controllable. The control device detects, as vehicle information, a vehicle speed, an acceleration, a state of acceleration operation by a driver, a state of deceleration operation by the driver, and a state of steering by the driver. The control device determines, based on the vehicle information, whether the driver has driving preference of emphasizing the steering stability performance of the vehicle or driving preference of emphasizing the ride comfort performance of the vehicle, and, according to the determined driving preference, changes an acceleration of the seat by controlling the seat suspension.

17 Claims, 17 Drawing Sheets

(51) Int. Cl.
  *B60N 2/42* (2006.01)
  *B60N 2/427* (2006.01)
  *B60N 2/50* (2006.01)
  *B60L 7/10* (2006.01)
  *B60W 60/00* (2020.01)

(52) U.S. Cl.
  CPC ............ *B60G 2500/22* (2013.01); *B60L 7/10* (2013.01); *B60W 60/005* (2020.02)

(56) References Cited

U.S. PATENT DOCUMENTS

| | | | | |
|---|---|---|---|---|
| 5,941,920 | A * | 8/1999 | Schubert | F16F 15/02 |
| | | | | 701/50 |
| 6,199,820 | B1 * | 3/2001 | Ritchie | B60N 2/502 |
| | | | | 248/421 |
| 6,237,889 | B1 * | 5/2001 | Bischoff | B63B 39/005 |
| | | | | 180/902 |
| 6,241,209 | B1 * | 6/2001 | von Mayenburg | B60N 2/522 |
| | | | | 248/421 |
| 6,286,819 | B1 * | 9/2001 | Ritchie | B60N 2/507 |
| | | | | 248/550 |
| 6,354,556 | B1 * | 3/2002 | Ritchie | B60N 2/525 |
| | | | | 248/421 |
| 6,371,456 | B1 * | 4/2002 | Ritchie | F16F 15/02 |
| | | | | 248/550 |
| 8,413,942 | B2 * | 4/2013 | Ward | B60N 2/501 |
| | | | | 248/419 |
| 9,199,563 | B2 * | 12/2015 | Howard | B60N 2/0276 |
| 9,371,882 | B2 * | 6/2016 | Haller | F16F 9/34 |
| 9,694,727 | B2 * | 7/2017 | Haller | B60N 2/164 |
| 9,758,078 | B2 * | 9/2017 | Haller | B60N 2/505 |
| 9,809,136 | B2 * | 11/2017 | Haller | B60N 2/508 |
| 9,849,816 | B2 * | 12/2017 | Kolb | F16F 13/002 |
| 9,879,744 | B2 * | 1/2018 | Haller | F16F 9/46 |
| 9,937,832 | B2 * | 4/2018 | Haller | B60N 2/508 |
| 9,994,239 | B2 * | 6/2018 | Haller | F16F 9/46 |
| 10,065,541 | B2 * | 9/2018 | Haller | B60N 2/527 |
| 10,682,933 | B2 * | 6/2020 | Bischoff | B60N 2/505 |
| 10,836,232 | B2 * | 11/2020 | Plath | B60G 17/019 |
| 11,427,115 | B2 * | 8/2022 | Maust | B60N 2/505 |
| 2014/0358378 | A1 * | 12/2014 | Howard | F16F 15/00 |
| | | | | 701/45 |
| 2014/0379215 | A1 * | 12/2014 | Kikuchi | B60G 17/018 |
| | | | | 701/37 |
| 2017/0232871 | A1 * | 8/2017 | Asai | B60N 2/522 |
| | | | | 297/344.15 |
| 2018/0022402 | A1 * | 1/2018 | Hamilton | B62D 33/0604 |
| | | | | 296/190.07 |
| 2021/0107385 | A1 * | 4/2021 | Kuretake | B60N 2/502 |
| 2021/0155313 | A1 * | 5/2021 | Ericksen | B62K 25/06 |
| 2022/0025954 | A1 * | 1/2022 | Pickett | B62K 25/06 |
| 2022/0126846 | A1 * | 4/2022 | Maekawa | B60W 50/0205 |

* cited by examiner (WITHOUT CONTROL)

(WITH CONTROL)

VEHICLE CONTROL DEVICE

CROSS-REFERENCE TO RELATED APPLICATION

This application claims priority to Japanese Patent Application No. 2021-063344 filed on Apr. 2, 2021, incorporated herein by reference in its entirety.

BACKGROUND

1. Technical Field

The present disclosure relates to a vehicle control device that controls vibration propagating from a wheel and a chassis to a seat, shift of the seat, and the like.

2. Description of Related Art

Japanese Unexamined Patent Application Publication No. 63-8009 (JP 63-8009 A) describes an invention relating to an active suspension that aims to restrict changes in the posture of a vehicle as well as to improve the ride comfort relative to micro vibration from a road surface. The active suspension described in JP 63-8009 A includes: a hydraulic cylinder provided between a vehicle body-side member and a wheel-side member; a pressure control valve that controls a hydraulic fluid pressure of the hydraulic cylinder; a throttle valve and a hydraulic accumulator that generate a damping force in response to a pressure fluctuation corresponding to a resonance frequency range of an unsprung part of the vehicle; posture change detection means that detects a change in the posture of a vehicle body; and a postural change restriction and control device. The hydraulic accumulator communicates with a pressure chamber of the hydraulic cylinder through the throttle valve. The postural change restriction and control device controls the pressure control valve according to a change in the posture of the vehicle body and restricts shaking of the vehicle body in a resonance frequency range of a sprung part. In the active suspension described in JP 63-8009 A, the damping characteristics of the throttle valve are selected so as to meet a relation $F_1/V_1 \leq F_2/V_2$, where $V_1$ is a piston speed of the hydraulic cylinder corresponding to vibration near a resonance frequency of the sprung part; $F_1$ is a corresponding damping force; $V_2$ is a piston speed of the hydraulic cylinder corresponding to vibration near a resonance frequency of the unsprung part; and $F_2$ is a corresponding damping force.

SUMMARY

The active suspension described in JP 63-8009 A lowers each of the resonance frequency of the sprung part of the vehicle and the resonance frequency of the unsprung part thereof by using the hydraulic cylinder, the hydraulic accumulator, etc. Resonance of the sprung part of the vehicle affects the ride comfort performance for a driver and passengers on the seats. Resonance of the unsprung part of the vehicle affects the steering stability performance of the vehicle. The active suspension described in JP 63-8009 A restricts changes in the posture of the vehicle by controlling the hydraulic fluid pressure of the hydraulic cylinder according to a change in the posture of the vehicle, such as a nosedive upon braking, a roll, or a pitch. Thus, the steering stability relative to vibration (or shift) of the sprung part of the vehicle is improved. On the other hand, the ride comfort performance relative to fine bumps and dips on a paved road surface, for example, is improved by setting the specifications of the throttle valve of the hydraulic accumulator using the above relation $F_1/V_1 \leq F_2/V_2$ as a target.

However, it is not easy to improve both the steering stability performance of the vehicle and the ride comfort performance of the vehicle at the same time by the active suspension described in JP 63-8009 A. The conditions of the road surface on which the vehicle travels change constantly or variously. Therefore, even when the ride comfort performance is improved by selecting the throttle valve of the hydraulic accumulator as described above, the hydraulic accumulator may fail to appropriately absorb vibration if the conditions of the travel road surface change significantly or the vehicle travels on an unexpected road surface. Generally, when emphasis is put on the ride comfort performance for the driver and the passengers, the suspension of the vehicle becomes relatively soft. When the suspension of the vehicle becomes too soft, the steering stability performance of the vehicle degrades. Conversely, when emphasis is put on the steering stability performance of the vehicle, the suspension of the vehicle becomes relatively hard. When the suspension of the vehicle becomes too hard, the ride comfort performance of the vehicle degrades. Whether to emphasize the ride comfort performance of the vehicle or the steering stability performance of the vehicle depends on the preference and intention of the driver. However, the active suspension described in JP 63-8009 A takes no account of such characteristics of the vehicle corresponding to the preference and intention of the driver.

The present disclosure has been contrived with a focus on this technical problem, and an object thereof is to provide a vehicle control device that can make the mutually contradictory vehicle characteristics of the ride comfort performance and the steering stability performance of the vehicle compatible with each other, and can also control the vehicle characteristics according to the preference and intention of the driver.

To achieve this object, the present disclosure provides a control device of a vehicle including a vehicle suspension that is provided between an axle and a chassis of the vehicle and restricts and damps vibration, a seat suspension that is provided between the chassis and a seat and has a seat spring to restrict the vibration and a seat damper to damp the vibration and that is configured such that each of a spring constant of the seat spring and a damping coefficient of the seat damper is changeable and controllable, and a detection unit that detects vehicle information relating to a travel state of the vehicle and a state of operation by a driver. The control device includes a controller that controls the seat suspension based on the vehicle information. The detection unit detects, as the vehicle information, a vehicle speed, an acceleration of the vehicle (a vehicle front-rear acceleration in a front-rear direction of the vehicle, a vehicle lateral acceleration in a left-right direction of the vehicle, and a vehicle up-down acceleration in an up-down direction of the vehicle), a state of acceleration operation by the driver (e.g., an operation amount and an operation speed of an accelerator pedal), a state of deceleration operation by the driver (e.g., an operation amount and an operation state of a brake pedal), and a state of steering by the driver (e.g., a steering amount, a steering angle, and a steering speed of a steering wheel). The controller determines (or infers), based on the vehicle information detected by the detection unit, whether the driver has driving preference of emphasizing the steering stability performance of the vehicle or driving preference of emphasizing the ride comfort performance of the vehicle. According to the determined driving preference, the controller changes an acceleration of the seat (at least one of a seat front-rear acceleration in the front-rear direction, a seat lateral acceleration in the left-right direction, and a seat up-down acceleration in the up-down direction) (e.g., changes a vibration state of the seat, restricts or increases vibration transmitted to the seat, or shifts the seat) by controlling the seat suspension.

The controller in the present disclosure may be configured to make the acceleration of the seat (at least one of the seat front-rear acceleration, the seat lateral acceleration, and the seat up-down acceleration) higher (e.g., increases vibration transmitted to the seat or shifts the seat) when the controller determines that the driver has driving preference of emphasizing the steering stability performance more than the ride comfort performance than when the controller determines that the driver has driving preference of emphasizing the ride comfort performance more than the steering stability performance.

The controller in the present disclosure may be configured to change the acceleration of the seat (at least one of the seat front-rear acceleration, the seat lateral acceleration, and the seat up-down acceleration) according to shift shock of a stepped transmission with which the vehicle is actually equipped or a virtual stepped transmission.

The controller in the present disclosure may be configured to change the acceleration of the seat in a front-rear direction of the vehicle (the seat front-rear acceleration) when the vehicle is operated so as to accelerate or when the vehicle is operated so as to decelerate.

The controller in the present disclosure may be configured to change the acceleration of the seat in a left-right direction of the vehicle (the seat lateral acceleration) when the vehicle is steered.

In the present disclosure, the vehicle may be configured to be able to travel while selectively switching between at least two travel modes: one is a sport travel mode in which travel characteristics that emphasize the steering stability performance more than the ride comfort performance are set, and the other is a soft travel mode in which travel characteristics that emphasize the ride comfort performance more than the steering stability performance are set. The controller may be configured to make the acceleration of the seat (at least one of the seat front-rear acceleration, the seat lateral acceleration, and the seat up-down acceleration) higher (e.g., increases vibration transmitted to the seat or shifts the seat) when the sport travel mode is selected than when the soft travel mode is selected.

In the present disclosure, the vehicle may be configured to be able to travel while selectively switching between at least two driving modes: one is a manual driving mode in which the driver performs all of the acceleration operation, the deceleration operation, and the steering, and the other is an automated driving mode in which at least one of the acceleration operation, the deceleration operation, and the steering is automatically controlled. The controller may be configured to set, for each of the driving modes, a control amount for changing the acceleration of the seat (at least one of the seat front-rear acceleration, the seat lateral acceleration, and the seat up-down acceleration), and to make the control amount smaller (e.g., reduces a shift amount and a shift speed for shifting the seat) when the manual driving mode is selected than when the automated driving mode is selected.

In the present disclosure, the vehicle may be configured to have a plurality of seats that is formed as separate seats, and the seat suspension may be configured to be provided for each of the seats, between the chassis and the seat.

In the present disclosure, the vehicle may be configured to have a plurality of seats that is formed as separate seats and a one-piece floor member to which each of the seats is fixed, and the seat suspension may be configured to be provided between the chassis and the floor member.

In the present disclosure, the vehicle suspension may be configured to be provided between the axle and the chassis and have a vehicle spring to restrict the vibration and a vehicle damper to damp the vibration. The vehicle spring and the vehicle damper may be configured such that each of a spring constant of the vehicle spring and a damping coefficient of the vehicle damper is changeable and controllable. The controller may be configured to control the vehicle suspension based on the vehicle information, and to control the seat suspension and the vehicle suspension in a coordinated manner according to the determined driving preference.

In the present disclosure, the vehicle may be configured to include, as a drive power source, a motor capable of regenerative control during deceleration travel. The controller may be configured to, during deceleration travel, control the vehicle suspension so as to change each of the spring constant of the vehicle spring and the damping coefficient of the vehicle damper in such a direction that a ground contact load of a tire increases.

In the present disclosure, the vehicle may be configured to further include a seat actuator that shifts the seat in at least one of a front-rear direction, a left-right direction, and an up-down direction (in three-dimensional space), and a power source that drives the seat actuator. The controller may be configured to control the power source and the seat actuator based on the vehicle information, and to change the acceleration of the seat (at least one of the seat front-rear acceleration, the seat lateral acceleration, and the seat up-down acceleration) by controlling the seat suspension and the seat actuator according to the determined driving preference.

In the present disclosure, the vehicle suspension may be configured to be provided between the axle and the chassis and have a vehicle spring to restrict the vibration and a vehicle damper to damp the vibration. The vehicle spring and the vehicle damper may be configured such that each of a spring constant of the vehicle spring and a damping coefficient of the vehicle damper is changeable and controllable. The controller may be configured to control the vehicle suspension based on the vehicle information, and to control the seat suspension, the vehicle suspension, and the seat actuator in a coordinated manner according to the determined driving preference.

In the present disclosure, the vehicle may be configured to include, as a drive power source, a motor capable of regenerative control during deceleration travel. The controller may be configured to, during deceleration travel, control the vehicle suspension so as to change each of the spring constant of the vehicle spring and the damping coefficient of the vehicle damper in such a direction that a ground contact load of a tire increases.

In the present disclosure, the vehicle may be configured to include a collision detection device that detects a collision between the vehicle and an external object (e.g., another vehicle, a building, or an obstacle). The controller may be configured to, when the collision is detected, control the seat suspension so as to shift the seat in such a direction that the impact of the collision is mitigated. A "collision" between the vehicle and an external object includes at least one of a situation where the vehicle hits an external object and a situation where the vehicle gets hit by an external object.

"Detecting" a collision by the collision detection device includes at least one of predicting a collision immediately before it occurs and detecting a collision the moment it occurs.

In the present disclosure, the vehicle may be configured to include a collision detection device that detects a collision between the vehicle and an external object (e.g., another vehicle, a building, or an obstacle). The controller may be configured to, when the collision is detected, control at least one of the seat suspension and the seat actuator so as to shift the seat in such a direction that the impact of the collision is mitigated. A "collision" between the vehicle and an external object includes at least one of a situation where the vehicle hits an external object and a situation where the vehicle gets hit by an external object. "Detecting" a collision by the collision detection device includes at least one of predicting a collision immediately before it occurs and detecting a collision the moment it occurs.

The vehicle to be controlled in the present disclosure includes, between the chassis and the seat, the seat suspension of which each of the spring constant and the damping coefficient is variable. Thus, this seat suspension is a so-called active suspension, and the vehicle control device of the present disclosure can restrict vibration of the seat by controlling each of the spring constant and the damping coefficient of the seat suspension. The vehicle control device can also change the acceleration of the seat. Further, the vehicle control device of the present disclosure determines the driving preference of the driver based on the vehicle information relating to the travel state of the vehicle and the state of operation of the vehicle by the driver. For example, whether the driver has driving preference of emphasizing the steering stability performance of the vehicle or driving preference of emphasizing the ride comfort performance of the vehicle is determined or inferred based on the vehicle speed, the speed with which the driver operates the accelerator pedal, the speed with which the driver steers the steering wheel, etc. Based on the determined driving preference of the driver, the acceleration of the seat is changed by controlling the seat suspension (seat acceleration control). For example, when it is determined that the driver has driving preference of emphasizing the steering stability performance of the vehicle more than the ride comfort performance, the seat suspension is controlled such that vibration transmitted to the seat increases (i.e., the acceleration of the seat increases). Thus, the driver and the passengers on the seats can experience dynamic or powerful travel characteristics corresponding to the travel state of the vehicle or the state of operation by the driver. Conversely, when it is determined that the driver has driving preference of emphasizing the ride comfort performance of the vehicle more than the steering stability performance, the seat suspension is controlled such that vibration transmitted to the seat is restricted (i.e., the acceleration of the seat decreases). Thus, the driver and the passengers on the seats can experience even and smooth travel characteristics, with vibration from the chassis, shift of the seats, and the like restricted. Therefore, the vehicle control device of the present disclosure can make the mutually contradictory vehicle characteristics of the ride comfort performance and the steering stability performance of the vehicle compatible with each other, and can further control the vehicle characteristics according to the driving preference and intention of the driver. The acceleration of the seat that is changed according to the driving preference as described above is at least an acceleration in one direction among the acceleration of the seat in the vehicle front-rear direction, the acceleration of the seat in the vehicle left-right direction, and the acceleration of the seat in the vehicle up-down direction. To change such an acceleration of the seat, the acceleration in one of these directions may be changed alone. Alternatively, the accelerations in more than one direction may be compositely changed.

When determining the driving preference of the driver and changing the acceleration of the seat according to the determined driving preference as described above, the vehicle control device of the present disclosure makes the acceleration of the seat higher when it determines that the driver has driving preference of emphasizing the steering stability performance of the vehicle more than the ride comfort performance than when it determines that the driver has driving preference of emphasizing the ride comfort performance more than the steering stability performance That is, a change amount by which the acceleration of the seat is changed is made larger. Or a change speed (a jerk) at which the acceleration of the seat is changed is made higher. For example, vibration transmitted from the chassis side to the seat is increased. Or the seat is shifted such that the acceleration of the seat increases. Thus, the driver and the passengers on the seats can experience dynamic or powerful travel characteristics according to the determined driving preference of the driver. Conversely, the control device makes the acceleration of the seat lower when it determines that the driver has driving preference of emphasizing the ride comfort performance of the vehicle more than the steering stability performance than when it determines that the driver has driving preference of emphasizing the steering stability performance more than the ride comfort performance. That is, a change amount by which the acceleration of the seat is changed is made smaller. Or a change speed (a jerk) at which the acceleration of the seat is changed is made lower. For example, vibration transmitted from the chassis side to the seat is restricted. Or the seat is shifted such that the acceleration of the seat decreases. Thus, the driver and the passengers on the seats can experience even and smooth travel characteristics, with vibration and shift of the seats and the like restricted, according to the determined driving preference of the driver. Thus, the vehicle control device of the present disclosure can appropriately control the vehicle characteristics according to the driving preference and intention of the driver.

The vehicle to be controlled in the present disclosure is equipped with a stepped transmission. Or the vehicle is not actually equipped with a stepped transmission, but can virtually produce shift shock upon gear change or behavior of a transmission based on a virtual stepped transmission with which the vehicle is assumed to be equipped. In such a case where the vehicle includes an actual stepped transmission or a virtual stepped transmission, the vehicle control device of the present disclosure changes the acceleration of the seat according to actual shift shock or virtual shift shock of the stepped transmission as described above. For example, the acceleration of the seat is changed according to actual shift shock so as to restrict the shift shock, i.e., to prevent the driver on the seat from feeling the shift shock. Or the acceleration of the seat is changed according to shift shock that does not actually occur to thereby generate virtual vibration or shift and create shift shock. Shift shock can be restricted, for example, when the ride comfort performance of the vehicle is prioritized. Or when the vehicle is not equipped with a transmission or is equipped with a continuously variable transmission, shift shock can be intentionally produced. Thus, the vehicle control device of the present disclosure can control shift shock of the transmission according to the driving preference and intention of the driver.

The vehicle control device of the present disclosure changes the acceleration in the seat front-rear direction (the seat front-rear acceleration) when the vehicle is operated so as to accelerate or when the vehicle is operated so as to decelerate. For example, when it is determined that the driver has driving preference of emphasizing the steering stability performance and the power performance of the vehicle more than the ride comfort performance, the seat front-rear acceleration is increased in an acceleration direction according to the acceleration operation by the driver. Or the seat front-rear acceleration is increased in a deceleration direction according to the deceleration operation by the driver. As a result, the front-rear acceleration in the acceleration direction resulting from the acceleration operation by the driver and the seat front-rear acceleration in the acceleration direction increased by the control overlap each other. Or the front-rear acceleration in the deceleration direction resulting from the deceleration operation by the driver and the seat front-rear acceleration in the acceleration direction increased by the control overlap each other. Thus, the driver and the passengers on the seats can experience dynamic or powerful travel characteristics corresponding to the acceleration state or the deceleration state of the vehicle or to the acceleration operation or the deceleration operation by the driver. Conversely, when it is determined that the driver has driving preference of emphasizing the ride comfort performance of the vehicle more than the steering stability performance and the power performance, the seat front-rear acceleration is increased in the deceleration direction according to the acceleration operation by the driver. Or the seat front-rear acceleration is increased in the acceleration direction according to the deceleration operation by the driver. As a result, the front-rear acceleration in the acceleration direction resulting from the acceleration operation by the driver and the seat front-rear acceleration in the deceleration direction increased by the control cancel each other. Or the front-rear acceleration in the deceleration direction resulting from the deceleration operation by the driver and the seat front-rear acceleration in the acceleration direction increased by the control cancel each other. Thus, the driver and the passengers on the seats can experience even and smooth travel characteristics during acceleration or deceleration of the vehicle. Further, the seat front-rear acceleration is increased in the acceleration direction, for example, when the vehicle is suddenly braked. As a result, the acceleration in the deceleration direction resulting from the sudden braking and the seat front-rear acceleration increased by the control cancel each other, which can mitigate the impact and the rapid deceleration feel that the sudden braking causes to the driver and the passengers. Thus, the vehicle control device of the present disclosure can appropriately control the vehicle characteristics according to the driving preference and intention of the driver.

The vehicle control device of the present disclosure changes the acceleration in the seat left-right direction (the seat lateral acceleration) when the vehicle is steered. For example, when it is determined that the driver has driving preference of emphasizing the steering stability performance and the power performance of the vehicle more than the ride comfort performance, the seat lateral acceleration is increased in the acceleration direction according to the steering by the driver. As a result, the vehicle lateral acceleration in the acceleration direction resulting from the steering by the driver and the seat lateral acceleration in the acceleration direction increased by the control overlap each other. Thus, the driver and the passengers on the seats can experience dynamic or powerful travel characteristics according to the steering by the driver. Conversely, when it is determined that the driver has driving preference of emphasizing the ride comfort performance of the vehicle more than the steering stability performance and the power performance, the seat lateral acceleration is increased in the deceleration direction according to the steering by the driver. As a result, the vehicle lateral acceleration in the acceleration direction resulting from the steering by the driver and the seat lateral acceleration in the deceleration direction increased by the control cancel each other. Thus, the driver and the passengers on the seats can experience even and smooth travel characteristics during the steering of the vehicle. Therefore, the vehicle control device of the present disclosure can appropriately control the vehicle characteristics according to the driving preference and intention of the driver.

The vehicle to be controlled in the present disclosure can selectively set at least two travel modes, the sport travel mode and the soft travel mode, that are different in travel characteristics. The sport travel mode is a travel mode in which travel characteristics that emphasize the steering stability performance of the vehicle more than the ride comfort performance are set, and the soft travel mode is a travel mode in which travel characteristics that emphasize the ride comfort performance of the vehicle more than the steering stability performance are set. These travel modes are automatically selected and set by control according to, for example, the driving preference of the driver determined based on the vehicle information. Or these travel modes are manually selected and set by selection means operated by the driver, for example, a selection switch or a touch sensor. The vehicle control device of the present disclosure makes the acceleration of the seat higher when the sport travel mode is set than when the soft travel mode is set. That is, a change amount by which the acceleration of the seat is changed is made larger. Or a change speed (a jerk) at which the acceleration of the seat is changed is made higher. For example, vibration transmitted from the chassis side to the seat is increased. Or the seat is shifted such that the acceleration of the seat increases. Thus, the driver and the passengers on the seats can experience dynamic or powerful travel characteristics in the sport travel mode. Conversely, the control device makes the acceleration of the seat lower when the soft travel mode is set than when the sport travel mode is set. Or a change speed (a jerk) at which the acceleration of the seat is changed is made lower. That is, a change amount by which the acceleration of the seat is changed is made smaller. For example, vibration transmitted from the chassis side to the seat is reduced. Or the seat is shifted such that the acceleration of the seat decreases. Thus, the driver and the passengers on the seats can experience even and smooth travel characteristics, with vibration and shift of the seats and the like restricted, in the soft travel mode. Therefore, the vehicle control device of the present disclosure can appropriately control the vehicle characteristics according to the driving preference and intention of the driver.

Further, the vehicle to be controlled in the present disclosure can selectively set at least two driving modes, the manual driving mode and the automated driving mode, that are different in the operation state and the control state of the vehicle. These driving modes are automatically selected and set by control according to, for example, the driving preference of the driver determined based on the vehicle information. Or these driving modes are manually selected and set by selection means operated by the driver, for example, a selection switch or a touch sensor. The vehicle control device of the present disclosure makes a control amount for changing the acceleration of the seat smaller when the manual driving mode is set than when the automated driving mode is set. For example, a shift amount and a shift speed for shifting the seat to change the acceleration of the seat are made smaller and lower. When the driver steers the vehicle by himself or herself in the manual driving mode, the control amount relative to a change in the acceleration of the seat is reduced to make the driver aware of a situation where the vehicle's behavior is limited. In other words, the degree of intervention by control is reduced. Thus, the driver can be alerted in a situation where the vehicle's behavior approaches its limit, so that the driver can transition the vehicle to a safe travel state early. In the case where, for example, a semi-automated driving mode can be set as an intermediate driving mode between the manual driving mode and the automated driving mode, the control amount for changing the acceleration of the seat is made smaller when the semi-automated driving mode is set than when the automated driving mode is set. Thus, when a situation where the vehicle's behavior approaches its limit in the semi-automated driving mode arises, the driver can be made aware of and alerted to such a situation, so that the driver can transition the vehicle to a safe travel state early. Therefore, the vehicle control device of the present disclosure can improve the safety performance of a vehicle that can perform "automated driving" or "semi-automated driving."

In the vehicle to be controlled in the present disclosure, the seat suspension of the vehicle to be controlled is installed for each of the seats, between the seat and the chassis. That is, the seat suspension to be controlled in the present disclosure is provided under a seat of a vehicle having a conventional common configuration. Thus, the vehicle to be controlled of the present disclosure in which a so-called active suspension is provided under the seat can be configured with no major change made to the existing configuration of a vehicle. As the active suspension is provided for each of the separate seats, the control by the vehicle control device of the present disclosure can be appropriately executed so as to correspond to each occupant of the vehicle.

In the vehicle to be controlled in the present disclosure, the seat suspension of the vehicle to be controlled is installed between the chassis and the floor member to which the seats are fixed. Thus, also when the seats are formed as separate seats, the control by the vehicle control device of the present disclosure can be comprehensively executed. In addition, compared with when the active suspension is provided for each of the separate seats, the control by the vehicle control device of the present disclosure can be easily executed by a minimum number of active suspensions.

The vehicle to be controlled in the present disclosure includes, between the axle and the chassis, the vehicle suspension of which each of the spring constant and the damping coefficient is variable. Thus, the vehicle suspension is a so-called active suspension, and the vehicle control device of the present disclosure can restrict vibration of the axle by controlling each of the spring constant and the damping coefficient of the vehicle suspension. Further, the vehicle control device can change, for example, a ground contact state (ground contact load) of the tire. Moreover, the vehicle control device of the present disclosure controls the vehicle suspension and the seat suspension as described above in a coordinated manner according to the driving preference of the driver. For example, when it is determined that the driver has driving preference of emphasizing the ride comfort performance of the vehicle more than the steering stability performance, vibration transmitted to the seat is restricted by controlling the seat suspension such that the acceleration of the seat decreases. At the same time, the vehicle suspension is controlled to achieve an appropriate ground contact load of the tire according to the travel state. Thus, the driver and the passengers on the seats can experience even and smooth travel characteristics, with vibration from the chassis, shift of the seat, and the like restricted. At the same time, the steering stability performance and the motion performance of the vehicle can be improved. Therefore, the vehicle control device of the present disclosure can appropriately make the mutually contradictory vehicle characteristics of the ride comfort performance and the steering stability performance of the vehicle compatible with each other, and can further control the vehicle characteristics according to the driving preference and intention of the driver.

The vehicle to be controlled in the present disclosure is, for example, a hybrid electric vehicle or a battery electric vehicle, and includes a motor that can execute regenerative control during deceleration travel. During deceleration travel, the vehicle control device of the present disclosure controls the vehicle suspension such that the ground contact load of the tire increases. Thus, regenerative power generated by the motor during deceleration travel can be increased. Therefore, the vehicle control device of the present disclosure can improve the energy efficiency (electricity efficiency) of a hybrid electric vehicle or a battery electric vehicle, and can, by extension, cut the emission of greenhouse gas ($CO_2$ gas). The vehicle to be controlled in the present disclosure may include, for example, an antilock braking system or a traction control system. In this case, the vehicle control device of the present disclosure controls the vehicle suspension such that the ground contact load of the tire increases when the antilock braking system is activated or when the traction control system is activated. Thus, the behavioral stability of a vehicle having an antilock braking system or a traction control system can be improved.

The vehicle to be controlled in the present disclosure includes the seat actuator that shifts the seat in at least one of the front-rear direction, the left-right direction, and the up-down direction of the vehicle, i.e., at least one direction in three-dimensional space, and the power source (e.g., an electric motor) that drives the seat actuator. The vehicle control device of the present disclosure controls the seat actuator along with the seat suspension according to the driving preference of the driver. For example, the vehicle control device changes the acceleration of the seat by controlling the seat actuator in conjunction with the seat suspension. Thus, compared with when the acceleration of the seat is changed by the seat suspension alone, the acceleration of the seat can be changed more effectively or more actively. Therefore, the vehicle control device of the present disclosure can appropriately control the vehicle characteristics according to the driving preference and intention of the driver.

The vehicle to be controlled in the present disclosure includes the collision detection device that detects a collision between the vehicle and an external object. For example, the collision detection device detects a situation where the vehicle hits an external obstacle or another vehicle. Or the collision detection device detects a situation where the vehicle gets hit by another vehicle. The collision detection device may predict a collision between the vehicle and an external object immediately before it occurs. Or the collision detection device may detect a collision between the vehicle and an external object the moment it occurs. When the collision detection device detects a collision, the vehicle control device of the present disclosure controls the seat suspension so as to shift the seat in such a direction that the impact of the collision is mitigated. Or at least one of the seat suspension and the seat actuator is controlled. For example, at least one of the seat suspension and the seat actuator is controlled so as to cause acceleration in the opposite phase from the acceleration of the seat resulting from the impact of the collision. Therefore, even when the vehicle hits an external object or gets hit by an external object, the vehicle control device of the present disclosure can lessen the impact of the collision to protect the driver and the passengers in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the drawings. The embodiments shown below are merely examples of the present disclosure as embodied and not intended to limit the present disclosure.

Figure 1:
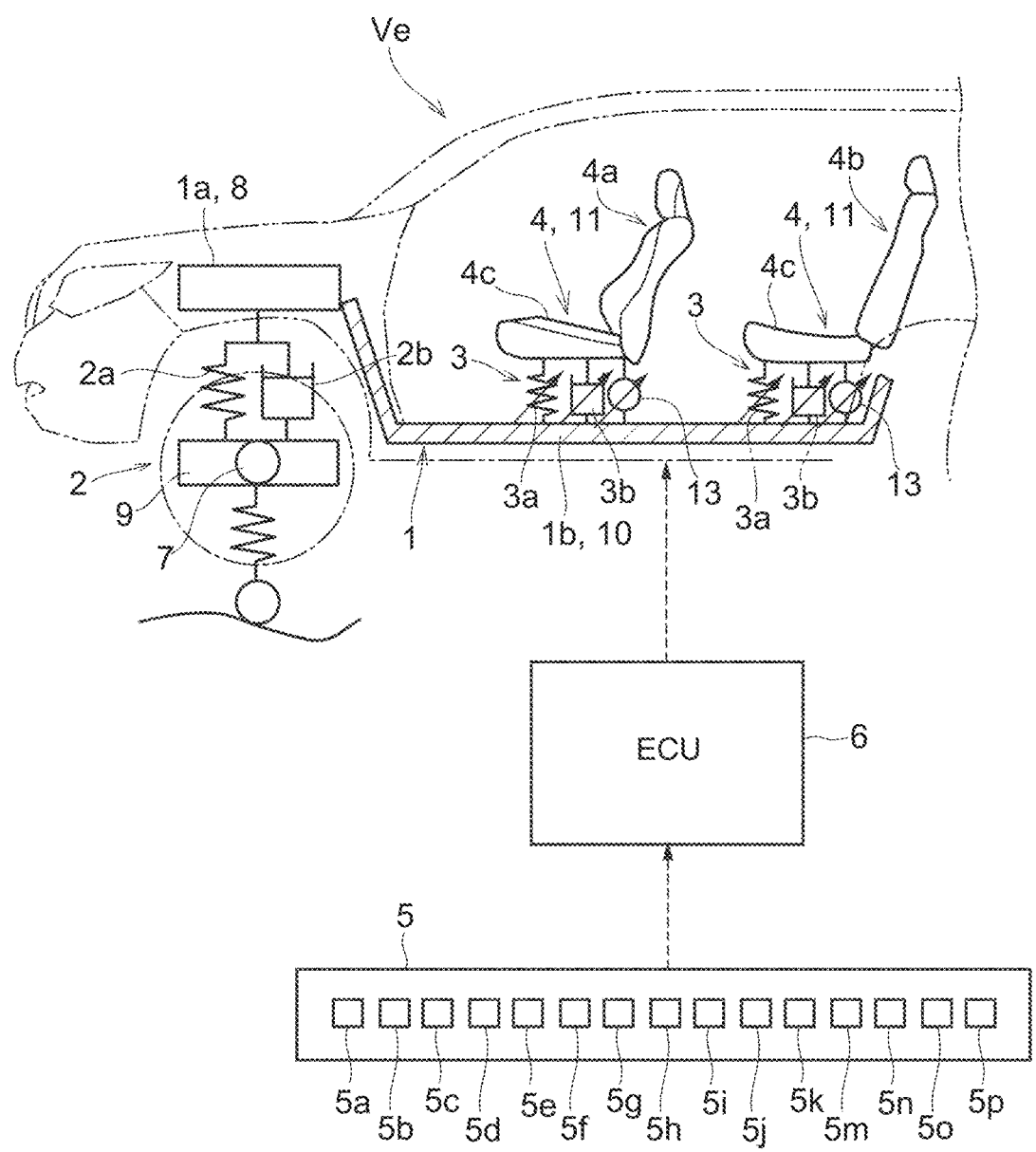
FIG. 1 is a view showing one example of the configuration of a vehicle to be controlled in the present disclosure (a configuration in which seat suspensions and seat actuators are disposed between seats and a chassis) and one example of a control system (a detection unit and a controller)

FIG. 1 shows one example of the configuration of a vehicle Ve that is an object to be controlled in the embodiments of the present disclosure and one example of a control system. The vehicle Ve includes, as main components, a chassis 1, vehicle suspensions 2, seat suspensions 3, seats 4, a detection unit 5, and a controller (ECU) 6.

The chassis 1 constitutes the framework of the vehicle Ve, and a drive power source (not shown) of the vehicle Ve, the vehicle suspensions 2, the seats 4, and others are mounted and fixed on the chassis 1. The chassis 1 may have a frame structure in which a body (not shown) is installed at an upper part of the chassis 1. Or the chassis 1 may have a so-called monocoque structure in which the chassis 1 and the body (not shown) are integrally formed. Or the chassis 1 may have a composite structure in which side frames (not shown) are installed on left and right sides of a monocoque structure. The chassis 1 has an axle support part 1a and an underbody part 1b.

An upper part (vehicle body-side part) of each vehicle suspension 2, to be described later, is mounted on the axle support part 1a. On a lower part (wheel-side part) of the vehicle suspension 2, an axle 7 and a wheel (not shown) are mounted. Thus, the axle support part 1a constitutes a sprung vehicle part 8 and supports the axle 7 and the wheels through the vehicle suspensions 2. On the other hand, an unsprung vehicle part 9 is formed by the axle 7 or a predetermined member that supports the axle 7.

A lower part (vehicle body-side part) of each seat suspension 3, to be described later, is mounted on the underbody part 1b. The seat 4 is mounted on an upper part of the seat suspension 3. Thus, the underbody part 1b constitutes an unsprung seat part 10 and supports the seats 4 through the seat suspensions 3. On the other hand, a sprung seat part 11 is formed by each seat 4. In the embodiment shown in FIG. 2, to be described later, the sprung seat part 11 is formed by a floor member 12.

The vehicle suspension 2 is provided between the axle 7 and the chassis 1 and restricts and damps vibration that propagates from a tire (not shown) and the axle 7 to the chassis 1. The vehicle suspension 2 is a suspension having a conventional common configuration that is installed in the vehicle Ve, and has a vehicle spring 2a and a vehicle damper 2b. In FIG. 1, the vehicle suspension 2 (the vehicle spring 2a and the vehicle damper 2b) is schematically represented as a vibration model.

The seat suspension 3 is provided between the chassis 1 and the seat 4 and restricts and damps vibration that propagates from the chassis 1 to the seat 4. The seat suspension 3 has a seat spring 3a and a seat damper 3b. The seat spring 3a restricts vibration that propagates from the chassis 1 to the seat 4. The seat spring 3a is configured such that the spring constant is changeable and controllable. For example, the seat spring 3a is formed by an air spring of which the spring constant can be varied by controlling the volume of compressed air inside an air cylinder or an air tank (not shown) or the internal pressure thereof. On the other hand, the seat damper 3b damps vibration that propagates from the chassis 1 to the seat 4. The seat damper 3b is configured such that the damping coefficient (or the damping ratio) is changeable and controllable. For example, the seat damper 3b is formed by a so-called electromagnetic damper of which the damping coefficient can be varied by electrically controlling a damping force using an electromagnetic force. Or the seat damper 3b may be formed by a hydraulic damper of which the damping coefficient can be varied by controlling the volume of oil inside a hydraulic cylinder (not shown) or a hydraulic tank or the internal pressure thereof. A plurality of seat suspensions 3 may be provided between the chassis 1 and the seat 4. In the embodiment shown in FIG. 1, the seat suspensions 3 are provided at four corners of the seat 4 as with seat actuators 13 to be described later. In FIG. 1, each seat suspension 3 (the seat spring 3a and the seat damper 3b) is schematically represented as a vibration model.

The seat 4 seats at least either a driver of the vehicle Ve or a passenger other than the driver. The seat 4 may be one seat for the driver or the passenger. Or the seat 4 may have a plurality of seats that is formed as separate seats. For example, in a frontmost row of the vehicle Ve, a plurality of seats 4 that is a driver's seat and a front passenger's seat is formed as separate seats. Or the seat 4 may be a so-called bench seat in which the driver's seat and the front passenger's seat are integrally formed. In the embodiment shown in FIG. 1, at least front seats (the driver's seat and the front passenger's seat) 4a in the frontmost row and rear seats 4b in a second row are formed as separate seats. Each seat 4 is mounted on the chassis 1 through the seat suspensions 3. Therefore, when the vehicle Ve includes a plurality of seats 4, in the embodiment shown in FIG. 1, each of the sets of seat suspensions 3 that are provided so as to correspond to the respective separate seats 4 is controlled on a seat-by-seat basis. Thus, "seat acceleration control" in the embodiments of the present disclosure can be appropriately executed so as to correspond to each of the driver and the passengers sitting in the respective seats 4. The "seat acceleration control" is characteristic control that is executed by a vehicle control device in the embodiments of the present disclosure, and detailed control contents etc. thereof will be described later.

Figure 2:
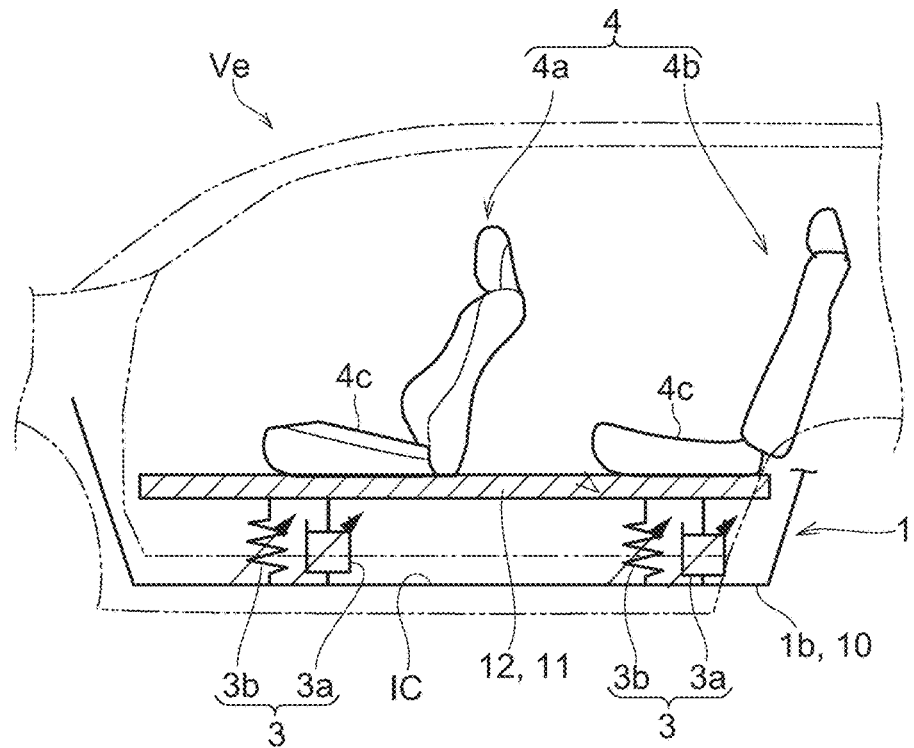
FIG. 2 is a view showing another example of the configuration of the vehicle to be controlled in the present disclosure (a configuration in which the seat suspensions are disposed between the chassis and a floor member to which the seats are fixed)

The vehicle Ve to be controlled in the embodiments of the present disclosure may include the floor member 12 between the seats 4 and the chassis 1, for example, as shown in FIG. 2. The floor member 12 is formed by a one-piece plate member having predetermined rigidity. The floor member 12 is formed as a member separate from a floor panel 1c that is fixed on the chassis 1. The seats 4 are mounted and fixed on the floor member 12. The floor member 12 is mounted on the chassis 1 or the floor panel 1c through the seat suspensions 3. Therefore, when the vehicle Ve includes a plurality of seats 4, in the embodiment shown in FIG. 2, the seat suspensions 3 provided between the floor member 12 and the chassis 1 are controlled in a state where all the seats 4 are fixed on the floor member 12. Thus, even when the seats 4 are formed as separate seats, the seat acceleration control in the embodiments of the present disclosure can be executed integrally or comprehensively. In addition, compared with when the seat suspension 3 is provided for each of the separate seats 4, the seat acceleration control in the embodiments of the present disclosure can be easily executed by a minimum number of seat suspensions 3.

Figure 3:
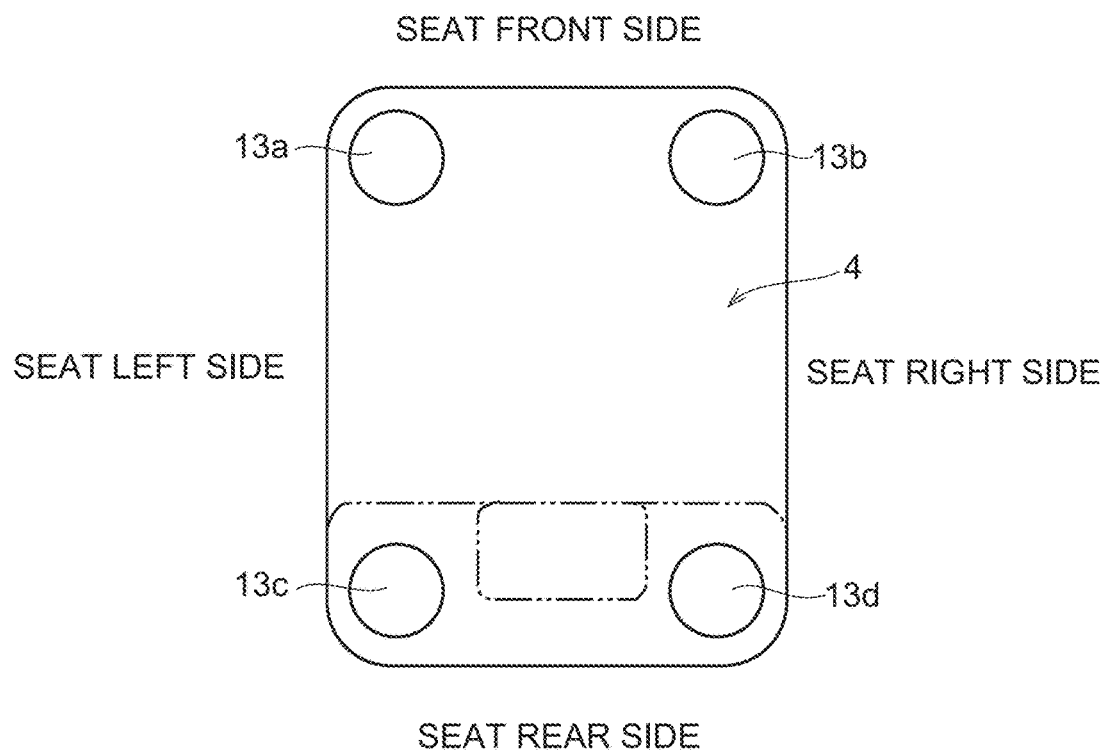
FIG. 3 is a view illustrating a configuration in which the seat actuators are disposed at four corners of the seat.
Figure 4:
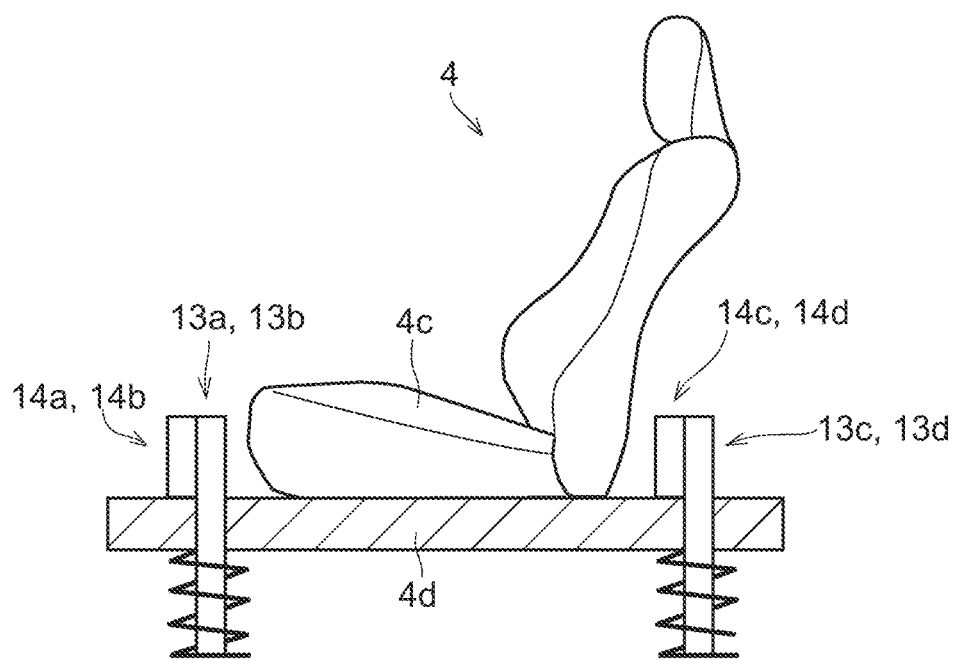
FIG. 4 is a view illustrating a configuration in which the seat actuators that move up and down in a vertical direction and electric motors that drive the seat actuators are provided.

Further, the vehicle Ve to be controlled in the embodiments of the present disclosure may include the seat actuator 13 that shifts the seat 4 in at least one of a front-rear direction, a left-right direction, and an up-down direction of the vehicle Ve, and an electric motor 14 as a power source that drives the seat actuator 13. In the embodiment shown in FIG. 1, the seat actuators 13 that move in the up-down direction of the vehicle Ve are provided at the four corners of the seat 4. Specifically, as shown in FIG. 3, a seat actuator 13a, a seat actuator 13b, a seat actuator 13c, and a seat actuator 13d are provided at a left front corner, a right front corner, a left rear corner, and a right rear corner, respectively, of the seat 4. As shown in FIG. 4, the seat actuators 13a, 13b, 13c, 13d operate on electric motors 14a, 14b, 14c, 14d, respectively, as drive power sources. In the embodiment shown in FIG. 4, a rack-and-pinion mechanism (not shown) is used, and the seat actuators 13a, 13b, 13c, 13d are each configured to move up and down. Each of the seat actuators 13a, 13b, 13c, 13d and the electric motors 14a, 14b, 14c, 14d is mounted on a base part 4d that forms a bottom part of the seat 4. In FIG. 4, the base part 4d of the seat 4 is represented in an exaggerated manner for the convenience of description.

In the case of the seat 4 provided with the seat actuators 13a, 13b, 13c, 13d as described above, the seat 4 can be shifted in the up-down direction of the vehicle Ve, for example, by equally moving the seat actuators 13a, 13b, 13c, 13d up and down. When the seat actuators 13a, 13b on the front side of the seat 4 and the seat actuators 13c, 13d on the rear side of the seat 4 are shifted in a vertical direction by different shift amounts, a seat surface 4c of the seat 4 inclines toward the front side or the rear side in the front-rear direction of the vehicle Ve. Thus, a component in the front-rear direction of the vehicle Ve occurs in the vector of the shift of the seat 4. In other words, the seat 4 can be shifted in the front-rear direction of the vehicle Ve. Further, when the seat actuators 13a, 13c on the left side of the seat 4 and the seat actuators 13b, 13d on the right side of the seat 4 are shifted in the vertical direction by different shift amounts, the seat surface 4c of the seat 4 inclines toward the left side or the right side in the left-right direction of the vehicle Ve. Thus, a component in the left-right direction of the vehicle Ve occurs in the vector of the shift of the seat 4. In other words, the seat 4 can be shifted in the left-right direction of the vehicle Ve. Thus, the seat 4 can be shifted in three-dimensional space by controlling the operation of each of the seat actuators 13 at the four corners of the seat 4. Other than the rack-and-pinion mechanism mentioned above, for example, a double-acting hydraulic actuator (not shown) or a linear motor (not shown) may be used to constitute the seat actuator 13 that moves up and down in the vertical direction.

Figure 5:
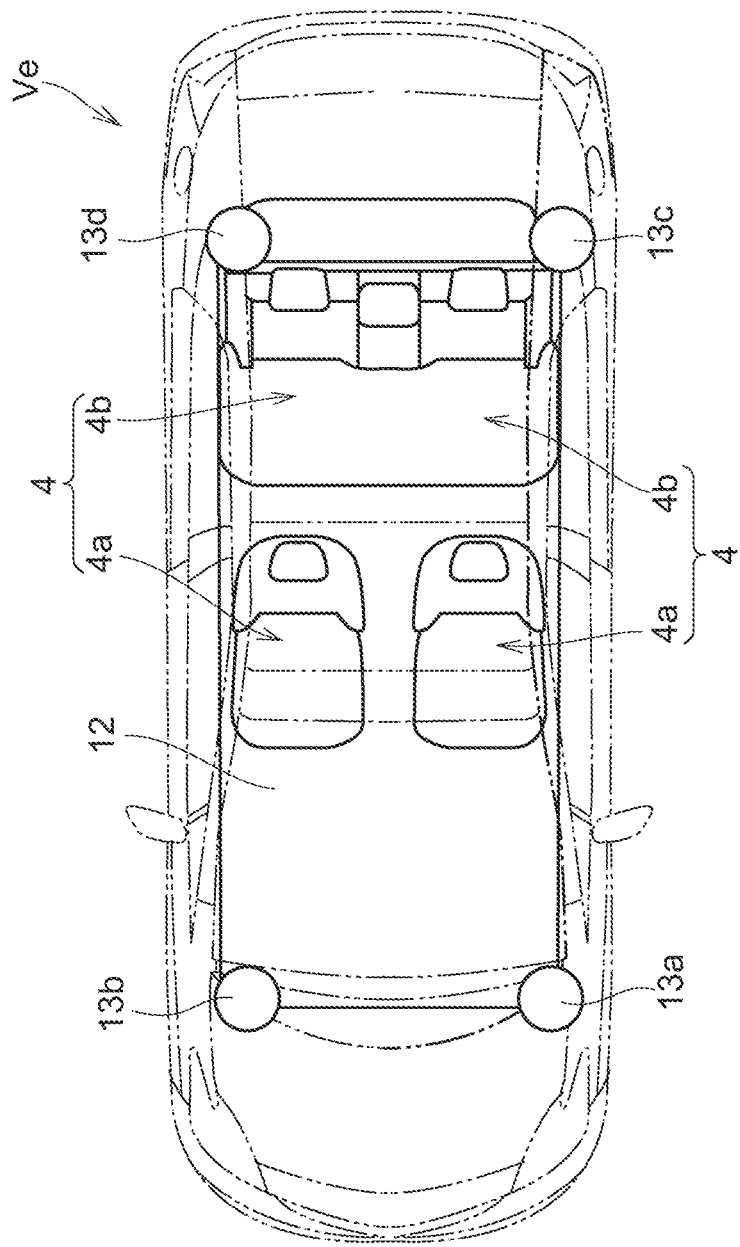
FIG. 5 is a view illustrating a configuration in which the seat actuators are disposed at four corners of the floor member to which the seats are fixed.

When each seat 4 of the vehicle Ve is fixed on the floor member 12 as shown in FIG. 2 described above, the seat actuators 13 may be provided at four corners of the floor member 12 as shown in FIG. 5. Specifically, the seat actuator 13a, the seat actuator 13b, the seat actuator 13c, and the seat actuator 13d may be provided at a left front corner, a right front corner, a left rear corner, and a right rear corner, respectively, of the floor member 12. Also in this case, as in the case where the seat actuators 13 are provided at the four corners of the seat 4, the floor member 12 can be shifted in three-dimensional space by controlling the operation of each of the seat actuators 13 at the four corners of the floor member 12.

The detection unit 5 detects or calculates data for executing control in the embodiments of the present disclosure, i.e., vehicle information relating to a travel state of the vehicle Ve and a state of operation of the vehicle Ve by the driver. For example, the detection unit 5 has: a vehicle front-rear acceleration sensor 5a that detects an acceleration in the front-rear direction of the vehicle Ve; a vehicle lateral acceleration sensor 5b that detects an acceleration in the left-right direction of the vehicle Ve (a vehicle width direction); a seat up-down acceleration sensor 5c that detects an unsprung seat acceleration (an acceleration in the vertical direction) of the seat suspension 3 at the unsprung seat part 10; a seat up-down acceleration sensor 5d that detects a sprung seat acceleration (an acceleration in the vertical direction) of the seat suspension 3 at the sprung seat part 11; a seat front-rear acceleration sensor 5e that detects an acceleration of the seat 4 in the front-rear direction of the vehicle Ve; a seat lateral acceleration sensor 5f that detects an acceleration of the seat 4 in the left-right direction of the vehicle Ve; and a seat shift sensor 5g that detects shift of the seat 4 in the up-down direction (the vertical direction) of the vehicle Ve. In addition, the detection unit 5 has, for example: a wheel speed sensor 5h for obtaining a vehicle speed; an accelerator position sensor 5i that detects an operation amount of an accelerator pedal (not shown) (accelerator operation amount); a brake sensor 5j that detects an operation amount and an operation state (on or off) of a brake pedal (not shown); a brake oil pressure sensor 5k that detects an oil pressure in a master cylinder of a brake device; a rotation speed sensor 5m that detects an output rotation speed of a drive power source (not shown); and a steering angle sensor 5n that detects an operation amount or a steering angle of a steering wheel (not shown). Further, the detection unit 5 has a camera 5o that detects external objects present around the vehicle Ve (e.g., other vehicles, buildings, obstacles, and people) as prediction information relating to the travel state of the vehicle Ve, a laser sensor 5p that detects bumps and dips on the road surface ahead and external objects ahead by means of laser light, and the like. The detection unit 5 may further have a navigation system (not shown) that receives radio waves from a Global Positioning System (GPS) satellite and acquires the conditions of the road surface ahead based on position information on the vehicle Ve and map information in a map database.

The controller 6 is an electronic control device that is configured, for example, around a microcomputer as a main component, and in the embodiment shown in FIG. 1, mainly controls each of the seat springs 3a and the seat dampers 3b of the seat suspensions 3 and the seat actuators 13 (the seat actuators 13a, 13b, 13c, 13d). In the embodiment shown in FIG. 7, to be described later, the controller 6 also controls each of a vehicle spring 15a and a vehicle damper 15b of a vehicle suspension 15. Various pieces of data detected or calculated by the detection unit 5 are input into the controller 6. The controller 6 performs calculations using input various pieces of data, and data, calculation formulae, etc. that are stored in advance. The controller 6 outputs the calculation result as a control command signal and controls each of the seat suspensions 3 and the seat actuators 13 (and the vehicle suspensions 15). That is, the controller 6 is configured to execute the seat acceleration control in the embodiments of the present disclosure.

Figure 6:
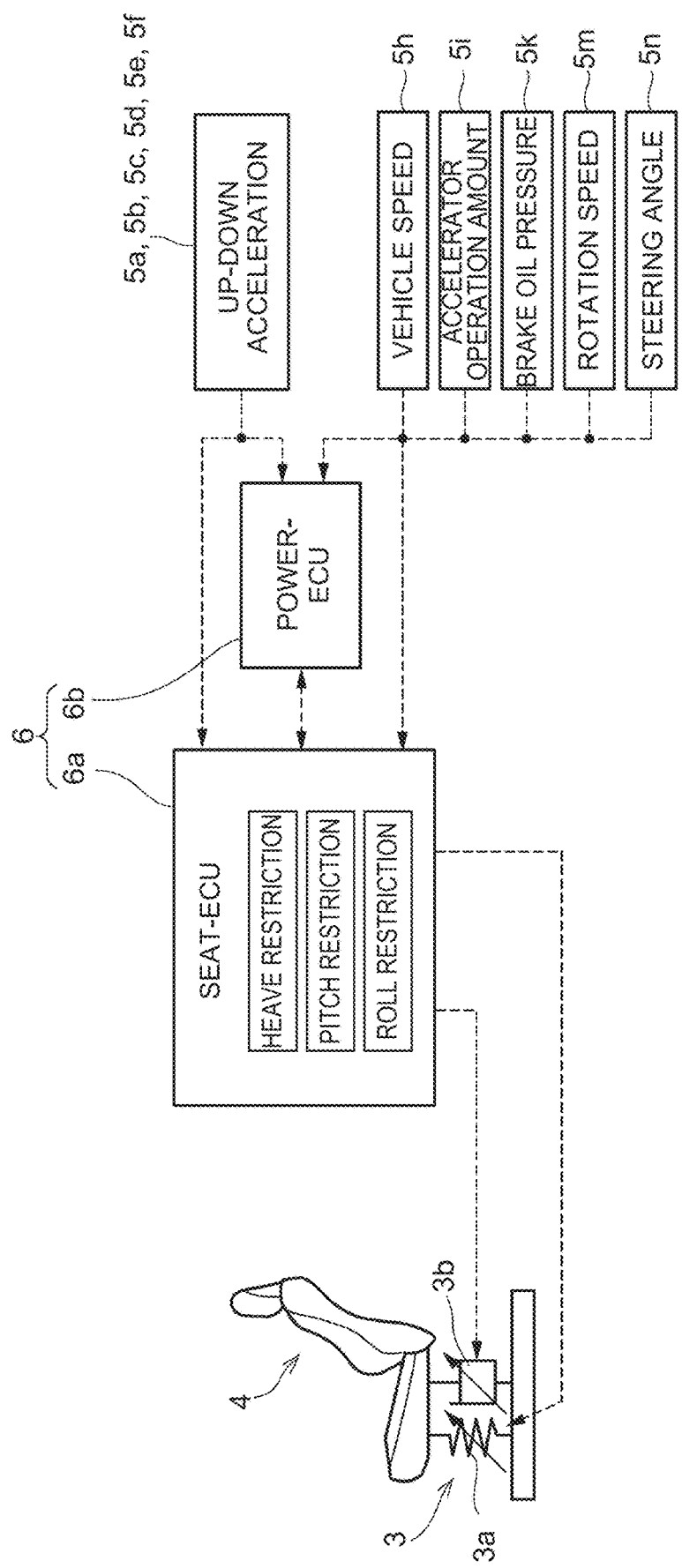
FIG. 6 is a diagram showing another example of the control system of the vehicle to be controlled in the present disclosure (an example in which a controller is configured as divided parts, a seat controller and a power controller)

While FIG. 1 shows the example in which one controller 6 is provided, the controller 6 may be provided as a plurality of parts for the respective devices and pieces of equipment to be controlled or for the respective control contents. One example is the embodiment shown in FIG. 6, in which the controller 6 is configured as two divided parts, a seat controller (SEAT-ECU) 6*a* and a power controller (POWER-ECU) 6*b*.

The seat controller 6*a* controls each of the seat springs 3*a* and the seat dampers 3*b* of the seat suspensions 3 and the seat actuators 13 (the seat actuators 13*a*, 13*b*, 13*c*, 13*d*) based on information from the detection unit 5.

The power controller 6*b* controls each of the drive power source and the brake device (not shown) of the vehicle Ve based on information from the detection unit 5. For example, the power controller 6*b* controls output of the drive power source based on required drive power (or required drive torque) calculated from a detection value of the accelerator position sensor 5*i*, and on the vehicle speed etc. The power controller 6*b* controls the operation of the brake device based on a detection value of the brake oil pressure sensor 5*k*. Thus, the power controller 6*b* controls drive power and a braking force of the vehicle Ve. Therefore, the controller 6 can more appropriately execute the seat acceleration control in the embodiments of the present disclosure as the seat controller 6*a* and the power controller 6*b* operate in conjunction with each other, with the former controlling the seat suspensions 3 and the seat actuators 13 and the latter controlling the drive power and the braking force of the vehicle Ve in a coordinated manner.

Figure 7:
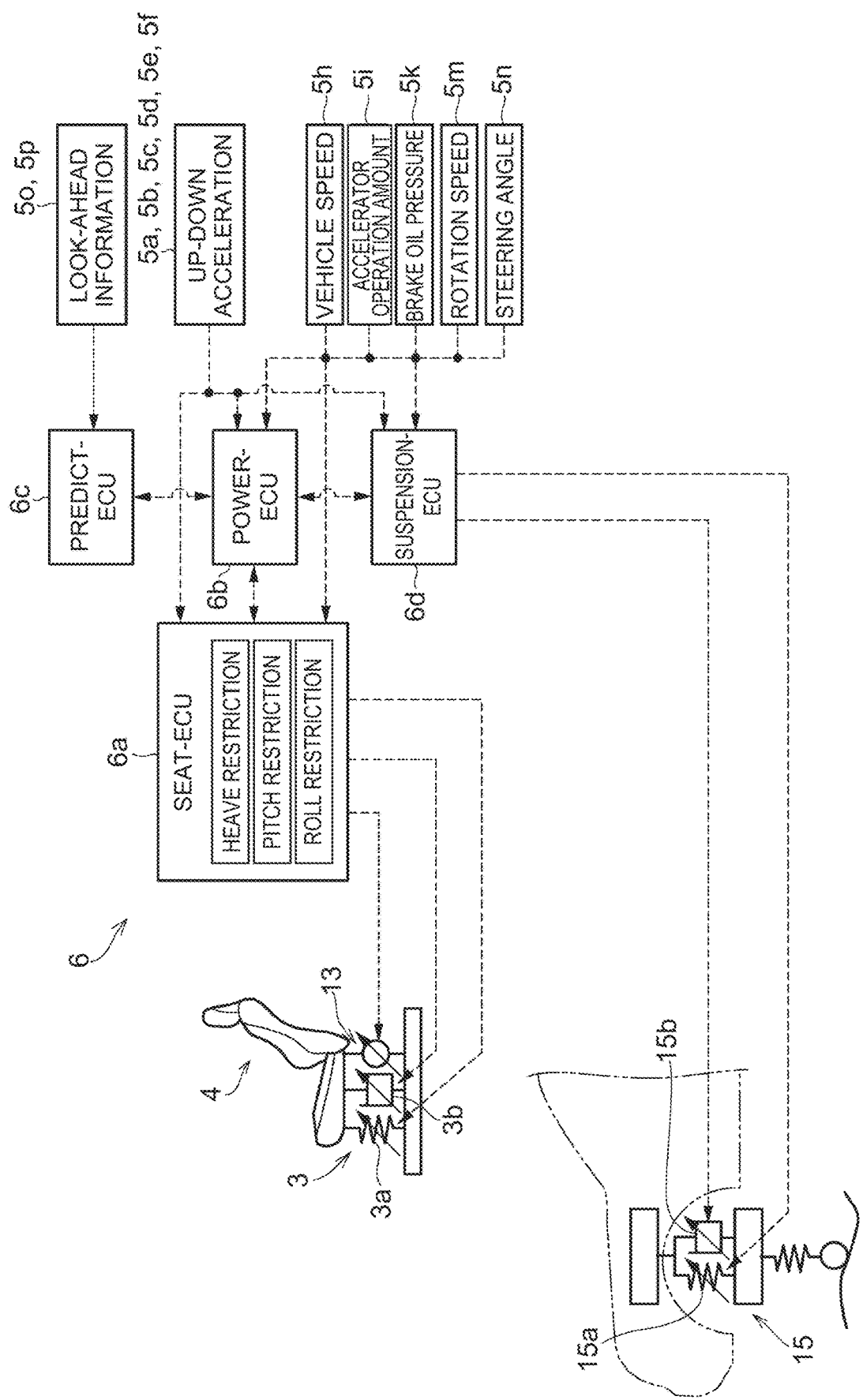
FIG. 7 is a diagram showing another example of the configuration of the vehicle to be controlled in the present disclosure and another example of the control system (examples in which the vehicle suspension is formed by an active suspension, and a look-ahead detection controller and a vehicle suspension controller are additionally provided)

As shown in FIG. 7, the controller 6 may additionally include a look-ahead detection controller (PREDICT-ECU) 6*c*. The look-ahead detection controller 6*c* outputs, to the seat controller 6*a*, signals for controlling the respective seat springs 3*a*, seat dampers 3*b*, and seat actuators 13 in advance based on look-ahead information from the camera 5*o*, the laser sensor 5*p*, the navigation system, and the like. The seat acceleration control in the embodiments of the present disclosure can be more actively executed by determining in advance or predicting the conditions of the road surface ahead of the vehicle Ve and reflecting the result on the control of the seat springs 3*a*, the seat dampers 3*b*, and the seat actuators 13.

Moreover, as shown in FIG. 7, the "vehicle suspension" of the vehicle Ve in the embodiments of the present disclosure may be formed by an active suspension of which the spring constant and the damping coefficient (or the damping ratio) are changeable and controllable. The vehicle suspension 15 shown in FIG. 7 has the vehicle spring 15*a* and the vehicle damper 15*b*. The vehicle spring 15*a* restricts vibration that propagates from the tire (not shown) and the axle 7 to the chassis 1. The vehicle spring 15*a* is configured such that the spring constant is changeable and controllable. For example, the vehicle spring 15*a* is formed by an air spring of which the spring constant can be varied by controlling the volume of compressed air inside an air cylinder or an air tank (not shown) or the internal pressure thereof. On the other hand, the vehicle damper 15*b* damps vibration that propagates from the tire (not shown) and the axle 7 to the chassis 1. The vehicle damper 15*b* is configured such that the damping coefficient (or the damping ratio) is changeable and controllable. For example, the vehicle damper 15*b* is formed by a so-called electromagnetic damper of which the damping coefficient can be varied by electrically controlling a damping force using an electromagnetic force. Or the vehicle damper 15*b* may be formed by a hydraulic damper of which the damping coefficient can be varied by controlling the volume of oil inside a hydraulic cylinder (not shown) or a hydraulic tank or the internal pressure thereof.

In the case where the vehicle Ve is equipped with the vehicle suspensions 15 of which the spring constant and the damping coefficient are variable as described above, the controller 6 includes a vehicle suspension controller (SUSPENSION-ECU) 6*d* that controls each of the vehicle springs 15*a* and the vehicle dampers 15*b* of the vehicle suspensions 15. Therefore, the controller 6 can more appropriately execute the seat acceleration control in the embodiments of the present disclosure as the seat controller 6*a* and the vehicle suspension controller 6*d* operate in conjunction with each other, with the former controlling the seat suspensions 3 and the seat actuators 13 and the latter controlling the vehicle suspensions 15 in a coordinated manner.

Figure 8:
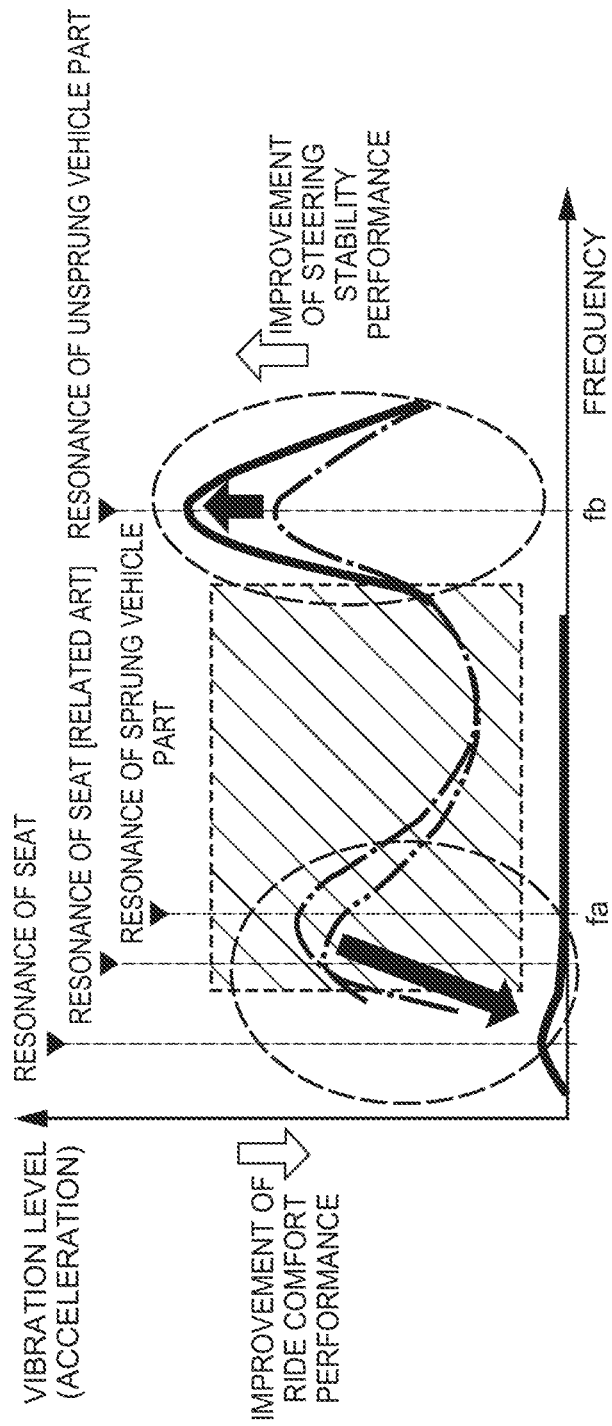
FIG. 8 is a graph illustrating a problem in a conventional control technology and the workings and effects of "seat acceleration control" of the present disclosure, and showing frequency characteristics of vibration that occurs at parts of the vehicle in response to input of predetermined vibration.

As described earlier, it is not easy to make the ride comfort performance and the steering stability performance of the vehicle compatible with each other by the conventional vehicle control technology involving a "seat suspension" or an "active suspension." For example, as indicated by the long dashed short dashed line in FIG. 8, resonance occurs at the sprung vehicle part 8 in a predetermined low-frequency range near a frequency fa in response to input of predetermined vibration. Resonance also occurs at the unsprung vehicle part 9 in a predetermined high-frequency range near a frequency fb. The long dashed short dashed line in FIG. 8 represents frequency characteristics serving as a base that assume a conventional common vehicle. As the vibration level of such resonance of the unsprung vehicle part 9 in the high-frequency range is higher, or as an acceleration in the up-down direction attributable to this resonance is higher, a ground contact load of the tire becomes higher and, as a result, the steering stability performance improves. Since this resonance in the high-frequency range is outside a vibration range (the hatched area in FIG. 8) in which occupants of the vehicle feel uncomfortable with vibration, it does not significantly affect the ride comfort performance of the vehicle. On the other hand, the resonance in the low-frequency range occurs inside the vibration range in which the occupants feel uncomfortable with vibration. Therefore, when resonance in the low-frequency range occurs at the sprung seat part 11, the ride comfort performance of the vehicle degrades.

For example, when the suspension of the vehicle is softened to restrict vibration and resonance, the ride comfort performance of the vehicle improves. However, as the suspension is softened, the resonance in the high-frequency range as described above is restricted accordingly, so that the ground contact load of the tire decreases. As a result, the steering stability performance degrades. Conversely, when the suspension of the vehicle is hardened to increase the ground contact load of the tire, the steering stability performance of the vehicle improves but the resonance in the low-frequency range as described above increases. As a result, the ride comfort performance degrades.

To deal with this problem, the conventional vehicle control technology provided with a controllable "seat suspension" executes vibration damping control using the "seat suspension" to thereby lower the resonance frequency in the low-frequency range and reduce the vibration level of the resonance as indicated by the long dashed double-short dashed line in FIG. 8. Thus, the ride comfort performance of the vehicle can be improved. However, the vibration damping control using the "seat suspension" cannot increase the ground contact load of the tire by raising the vibration level of the resonance in the high-frequency range. The conventional vehicle control technology is limited in terms of appropriately controlling both the resonance in the low-frequency range and the resonance in the high-frequency range as described above. In other words, it is not easy to make the ride comfort performance and the steering stability performance of the vehicle compatible with each other.

Further, as described above, it is also not easy to change the characteristics of the vehicle according to the preference and intention of the driver.

The vehicle control device in the embodiments of the present disclosure is configured to be able to make the ride comfort performance and the steering stability performance of the vehicle Ve as described above compatible with each other, as well as to control the vehicle characteristics according to the preference and intention of the driver. Basically, to make the ride comfort performance and the steering stability performance of the vehicle Ve compatible with each other, the vehicle Ve in the embodiments of the present disclosure has the vehicle suspensions 2 set toward improving the steering stability performance of the vehicle Ve, i.e., toward hardening the vehicle suspensions 2. Or when the vehicle suspensions 15 that are so-called "active suspensions" are used, the vehicle suspensions 15 are controlled toward improving the steering stability performance of the vehicle Ve, i.e., toward hardening the vehicle suspensions 15. At the same time, the vehicle control device in the embodiments of the present disclosure controls each of the seat suspensions 3 and the seat actuators 13 so as to reduce the frequency and the vibration level of the resonance of the sprung seat part 11 to such a level that the occupants of the vehicle Ve cannot feel the vibration.

Moreover, the vehicle control device in the embodiments of the present disclosure detects or calculates, as the vehicle information, data relating to the travel state of the vehicle Ve, the state of operation the vehicle Ve by the driver, etc. Based on the detected vehicle information, the vehicle control device determines or infers whether the driver has driving preference of emphasizing the steering stability performance of the vehicle Ve or driving preference of emphasizing the ride comfort performance of the vehicle Ve. For example, while the vehicle Ve is traveling at a vehicle speed equal to or higher than a predetermined value, the driving preference of the driver can be determined based on a state of operation of the accelerator pedal, a state of operation of the brake pedal, and a state of operation of the steering wheel by the driver. For example, when the operation amount of the accelerator pedal is larger, or the number of times the brake pedal is operated is larger, or the steering speed of the steering wheel is higher, it can be inferred that the driver has driving preference of emphasizing the steering stability performance of the vehicle Ve more than the ride comfort performance.

The vehicle Ve can travel while selectively switching between at least two travel modes: one is a sport travel mode in which travel characteristics that emphasize the steering stability performance of the vehicle Ve more than the ride comfort performance are set, and the other is a soft travel mode in which travel characteristics that emphasize the ride comfort performance of the vehicle Ve more than the steering stability performance are set. The sport travel mode and the soft travel mode are automatically selected and set by control according to, for example, the driving preference of the driver determined based on the vehicle information. Or these travel modes are manually selected and set by selection means directly operated by the driver, such as a selection switch (not shown) or a touch sensor (not shown).

The vehicle control device in the embodiments of the present disclosure controls the seat suspensions 3 based on the determined driving preference of the driver. When the vehicle Ve includes the seat actuators 13, the vehicle control device controls each of the seat suspensions 3 and the seat actuators 13. As the acceleration of the seats 4 is thereby changed, the driver and the passengers on the seats 4 experience a change in the characteristics (travel characteristics, vibration characteristics, etc.) of the vehicle Ve corresponding to the change in the acceleration of the seats 4. For example, when it is determined that the driver has driving preference of emphasizing the steering stability performance of the vehicle Ve more than the ride comfort performance, the seat suspensions 3 or each of the seat suspensions 3 and the seat actuators 13 is controlled such that the acceleration of the seats 4 increases, for example, vibration transmitted to the seats 4 increases. Therefore, the driver and the passengers on the seats 4 can experience dynamic or powerful travel characteristics corresponding to the travel state of the vehicle Ve or the state of operation by the driver. Conversely, when it is determined that the driver has driving preference of emphasizing the ride comfort performance of the vehicle Ve more than the steering stability performance, the seat suspensions 3 or each of the seat suspensions 3 and the seat actuators 13 is controlled such that the acceleration of the seats 4 decreases, i.e., vibration transmitted to the seats 4 is restricted. Therefore, the driver and the passengers on the seats 4 can experience even and smooth travel characteristics, with vibration from the chassis 1, shift of the seats 4, and the like restricted. The control that changes the acceleration of the seats 4 in this way is characteristic control executed by the vehicle control device in the embodiments of the present disclosure, and will be referred to as "seat acceleration control" in the description of the embodiments of the present disclosure.

Figure 11:
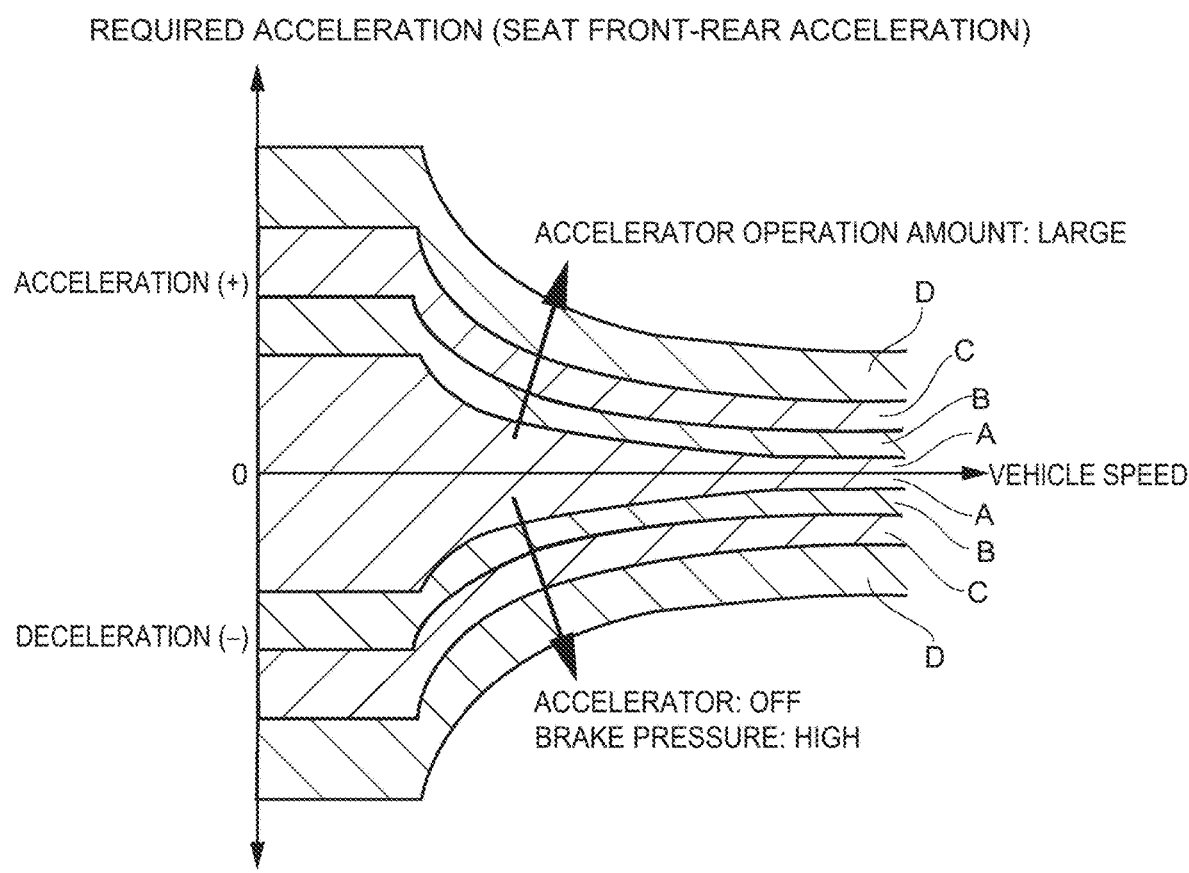
FIG. 11 is a graph illustrating control contents of the "seat acceleration control" executed by the vehicle control device of the present disclosure, and showing an image of a map (a required acceleration map) that is used to obtain a required acceleration for an acceleration of the seat in a vehicle front-rear direction from a relationship between a vehicle speed and operation amounts of an accelerator pedal and a brake pedal.
Figure 12:
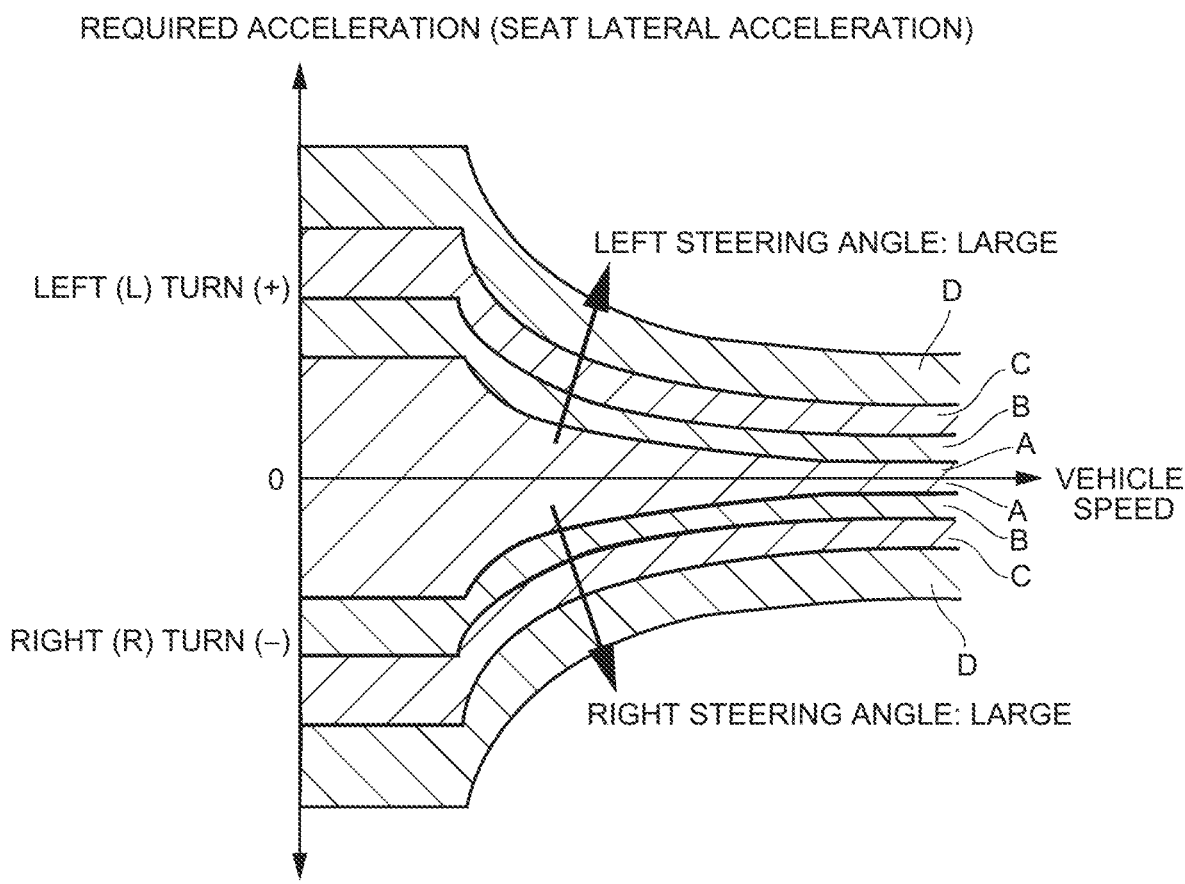
FIG. 12 is a graph illustrating control contents of the "seat acceleration control" executed by the vehicle control device of the present disclosure, and showing an image of a map (a required acceleration map) that is used to obtain a required acceleration for an acceleration of the seat in a vehicle left-right direction from a relationship between the vehicle speed and an operation amount of a steering wheel.

Specifically, the controller 6 in the embodiments of the present disclosure is configured to execute the seat acceleration control shown in the flowcharts of FIG. 9 and FIG. 10 to be described below. In the embodiment shown in FIG. 11 and FIG. 12, the vehicle Ve can travel while selectively switching among four levels of travel modes (A: soft travel mode, B: first sport travel mode, C: second sport travel mode, and D: aggressive travel mode). In the embodiment shown in FIG. 11 and FIG. 12, the "soft travel mode" is a travel mode that puts the most emphasis on the ride comfort performance of the vehicle Ve, and the "aggressive travel mode" is a travel mode that puts the most emphasis on the steering stability performance of the vehicle Ve. The "second sport travel mode" is a travel mode that puts the second most emphasis on the steering stability performance of the vehicle Ve after the "aggressive travel mode," and the "first sport travel mode" is a travel mode that puts the third most emphasis on the steering stability performance of the vehicle Ve after the "second sport travel mode." The vehicle Ve in the embodiments of the present disclosure is configured to be able to travel while selectively switching among a plurality of travel modes, i.e., between at least two levels of travel modes. The vehicle Ve may be configured to set three or more levels of travel modes as in the embodiment shown in FIG. 11 and FIG. 12. As will be described later, FIG. 11 shows an image of a map (required acceleration map) that is used to obtain a required acceleration for a front-rear acceleration of the seat 4 (a target value of the front-rear acceleration of the seat 4) from a relationship between the vehicle speed and the operation amounts of the accelerator pedal and the brake pedal (or the accelerator operation amount and the brake pressure). As will be described later, FIG. 12 shows an image of a map (required acceleration map) that is used to obtain a required acceleration for a lateral acceleration of the seat 4 (a target value of the lateral acceleration of the seat 4) from a relationship between the vehicle speed and the operation amount (or the steering angle) of the steering wheel. In the example of the seat acceleration control shown in the flowcharts of FIG. 9 and FIG. 10 to be described below, the "first sport travel mode" is representatively selected as the travel mode of the vehicle Ve.

Figure 9:
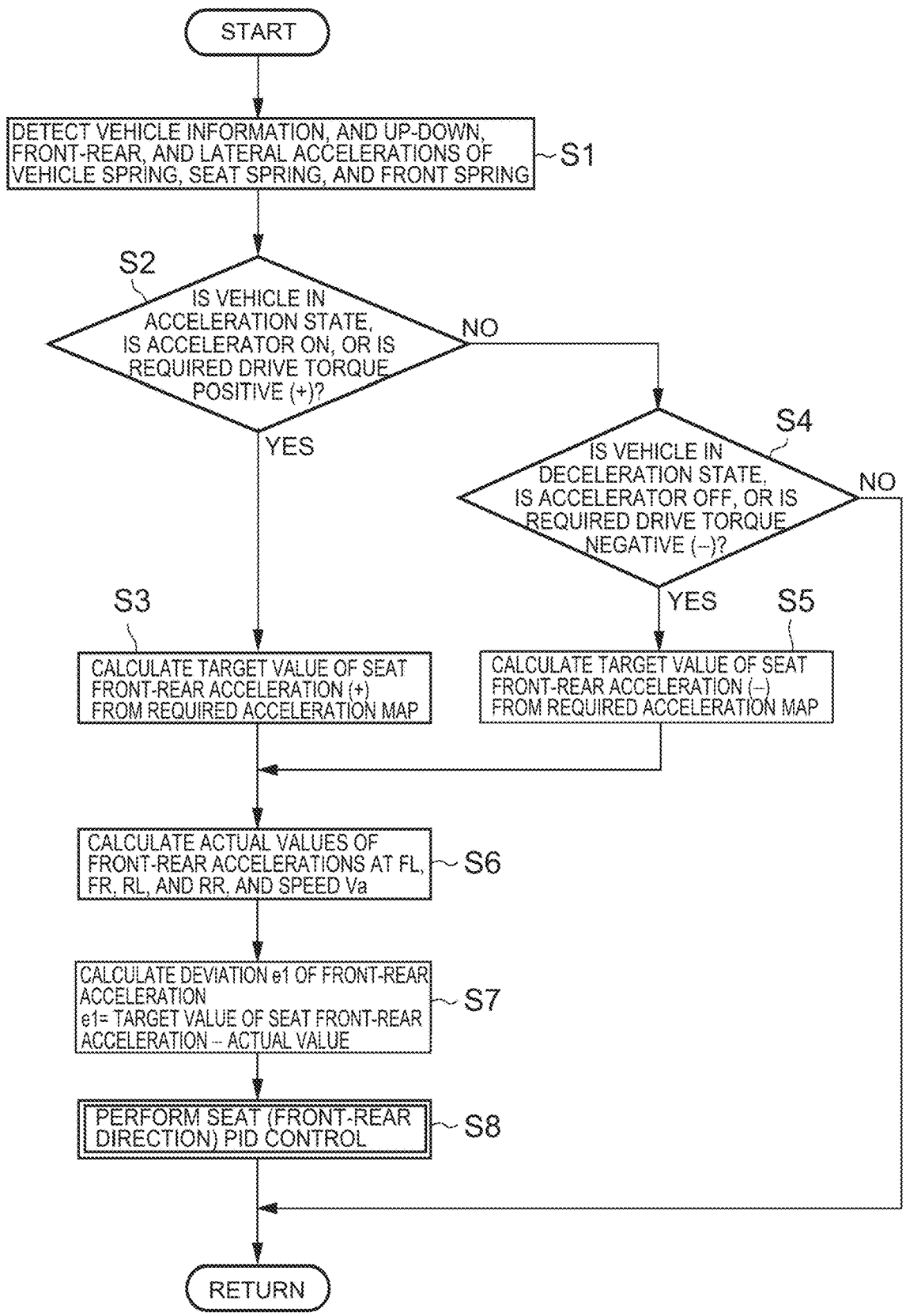
FIG. 9 is a flowchart illustrating basic control contents of the "seat acceleration control" executed by the vehicle control device of the present disclosure, and showing control contents of the "seat acceleration control" that is executed when the vehicle accelerates or decelerates while traveling.

The flowchart of FIG. 9 shows the seat acceleration control that is executed when the vehicle Ve accelerates or decelerates while traveling. In the seat acceleration control shown in the flowchart of FIG. 9, first, in step S1, the vehicle information relating to the travel state of the vehicle Ve, the state of operation of the vehicle Ve by the driver, etc. is detected. As such vehicle information, for example, a vehicle speed, an acceleration in the front-rear direction of the vehicle Ve (a vehicle front-rear acceleration), an acceleration in the left-right direction of the vehicle Ve (a vehicle lateral acceleration), an acceleration in the up-down direction (vertical direction) of the vehicle Ve (a vehicle up-down acceleration), a state of acceleration operation by the driver (e.g., the operation amount and the operation speed of the accelerator pedal), a state of deceleration operation by the driver (e.g., the operation amount and the operation speed of the brake pedal), and a state of steering by the driver (e.g., the operation amount and the operation speed of the steering wheel) are detected. Further, an unsprung vehicle acceleration of the vehicle suspension 2 at the unsprung vehicle part 9, a sprung vehicle acceleration of the vehicle suspension 2 at the sprung vehicle part 8, an upsprung seat acceleration of the seat suspension 3 at the unsprung seat part 10, a sprung seat acceleration of the seat suspension 3 at the sprung seat part 11, an acceleration of the seat 4 in the front-rear direction of the vehicle Ve (a seat front-rear acceleration), an acceleration of the seat 4 in the left-right direction of the vehicle Ve (a seat lateral acceleration), a shift of the seat 4 in the up-down direction (vertical direction) of the vehicle Ve, etc. are detected. Then, each of these detection values is read into the controller 6.

Next, in step S2, it is determined whether the vehicle Ve is in a state of accelerating while traveling. For example, it is determined whether the accelerator is on, i.e., whether the accelerator pedal is being operated by an operation amount (or an accelerator operation amount) equal to or larger than a predetermined value, or whether the required drive torque is a positive value equal to or larger than a predetermined value. For example, it is determined that the vehicle Ve is in the state of accelerating while traveling, when a detection value of the accelerator position sensor 5i is equal to or larger than the predetermined value, or when the required drive torque calculated from the detection value of the accelerator position sensor 5i is a positive value equal to or larger than the predetermined value.

When it is determined that the vehicle Ve is in the state of accelerating while traveling, and therefore the determination result of step S2 is affirmative, the controller 6 moves to step S3.

In step S3, a target value of the acceleration of the seat 4 in the front-rear direction of the vehicle Ve (the seat front-rear acceleration) when the vehicle Ve accelerates or decelerates while traveling is calculated from the required acceleration map. In this case, the target value of the acceleration in an acceleration (+) direction is calculated for the seat front-rear acceleration. As shown in FIG. 11, the required acceleration map is a map that is used to obtain the required acceleration for the seat front-rear acceleration (the target value of the seat front-rear acceleration) from the relationship between the vehicle speed, and the operation amount of the accelerator pedal (accelerator operation amount) and the operation amount of the brake pedal.

On the other hand, when it is determined that the vehicle Ve is not in the state of accelerating while traveling, and therefore the determination result of step S2 is negative, the controller 6 moves to step S4.

In step S4, it is determined whether the vehicle Ve is in a state of decelerating while traveling. For example, it is determined whether the accelerator is off, i.e., whether the operation amount of the accelerator pedal (or the accelerator operation amount) is "0" or smaller than a predetermined value that is close to "0," or whether the required drive torque is a negative value equal to or smaller than a predetermined value. Or it is determined whether the brake pedal is being operated by an operation amount equal to or larger than a predetermined value. For example, when a detection value of the accelerator position sensor 5i is smaller than the predetermined value that is close to "0," or when the required drive torque calculated from the detection value of the accelerator position sensor 5i is a negative value equal to or smaller than the predetermined value, or when a detection value of the brake sensor 5j is equal to or larger than a predetermined value, it is determined that the vehicle Ve is in the state of decelerating while traveling.

When it is determined that the vehicle Ve is in the state of decelerating while traveling, and therefore the determination result of step S4 is affirmative, the controller 6 moves to step S5. When it is determined that the vehicle Ve is not in the state of decelerating while traveling, and therefore the determination result of step S4 is negative, it can be determined that the vehicle Ve is in a state of cruising at a constant speed or in a stationary state. In this case, therefore, the controller 6 temporarily ends the seat acceleration control shown in the flowchart of FIG. 9 without executing the subsequent control.

In step S5, a target value of the seat front-rear acceleration when the vehicle Ve decelerates while traveling is calculated from the required acceleration map. In this case, a target value of the acceleration in a deceleration (−) direction for the seat front-rear acceleration is calculated.

When the required acceleration for the seat front-rear acceleration (the target value of the seat front-rear acceleration) is calculated in step S3 or step S5, the controller 6 moves to step S6.

In step S6, the actual value of the seat front-rear acceleration and a speed Va are calculated. The actual value of the seat front-rear acceleration can be calculated, for example, from detection values of the respective seat shift sensors 5g that are respectively provided on the left front side (FL), the right front side (FR), the left rear side (RL), and the right rear side (RR) of the seat 4. Or the actual value may be directly obtained from a detection value of the seat front-rear acceleration sensor 5e. The speed Va is a shift speed of the seat 4 in the front-rear direction of the vehicle Ve, and can be calculated, for example, based on the actual value of the seat front-rear acceleration calculated as described above. Or the speed Va may be obtained from the detection value of the seat front-rear acceleration sensor 5e by back calculation.

Figure 13:
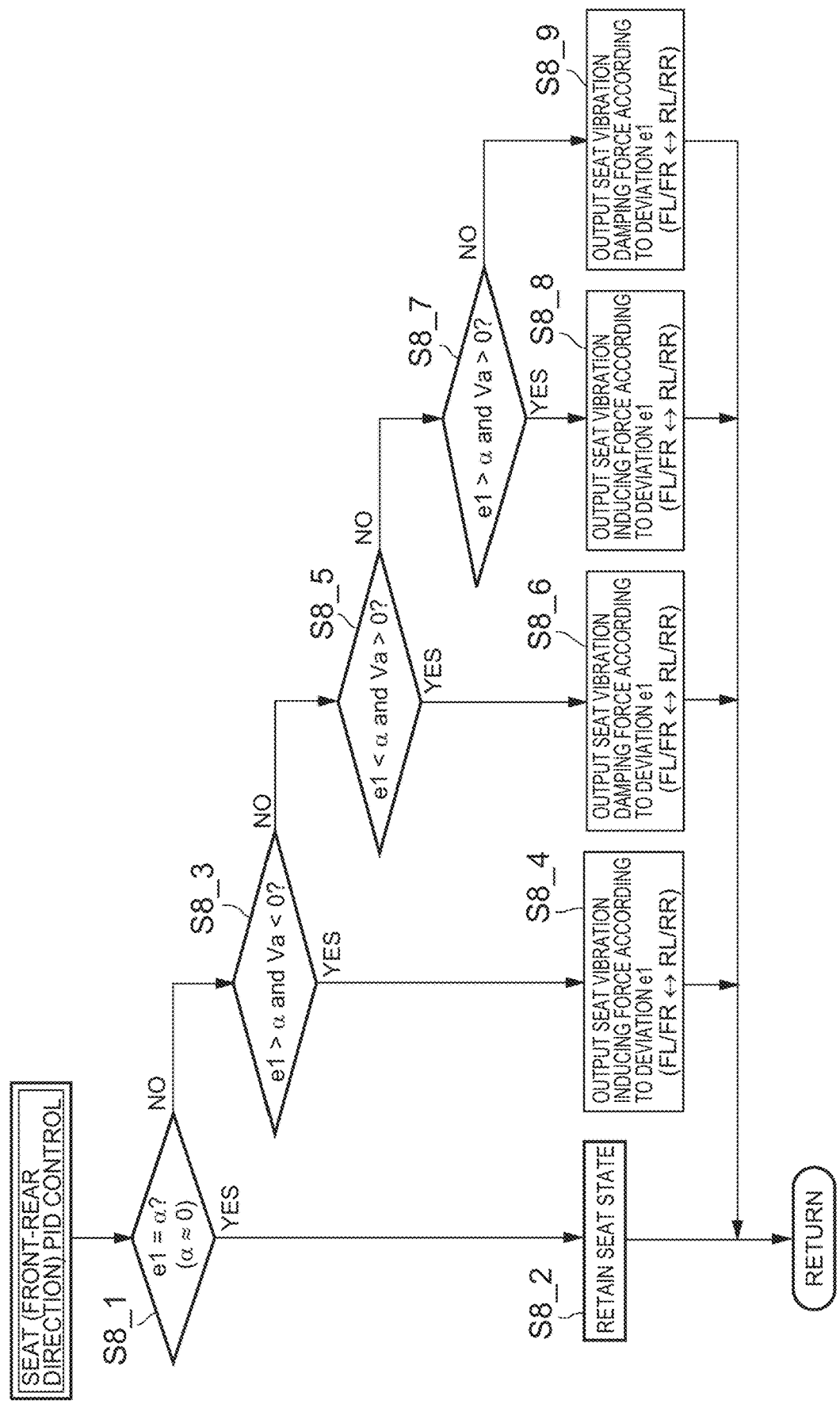
FIG. 13 is a flowchart illustrating detailed control contents of "seat (front-rear direction) PID control" executed in step S8 of the "seat acceleration control" shown in the flowchart of FIG. 9.

Next, in step S7, a deviation e1 of the seat front-rear acceleration is calculated. The deviation e1 is a deviation used in feedback control, and is used to execute PID control in the next seat acceleration control. The deviation e1 is the difference between the target value of the seat front-rear acceleration and the actual value of the seat front-rear acceleration. Specifically, the deviation e1 is calculated from the following calculation formula:

Deviation $e1$=target value of seat front-rear acceleration−actual value of seat front-rear acceleration In step S8, PID control in the seat acceleration control is executed. That is, seat acceleration control using a control method of PID control is executed. Detailed control contents of the seat acceleration control (front-rear direction) executed in step S8 are shown in the flowchart of FIG. 13.

First, in step S8_1, it is determined whether the deviation e1 of the seat front-rear acceleration is equal to "α." Here, "α" is a predetermined value that can be approximated to "0." As described above, the deviation e1 is a deviation used in the feedback control, and ideal feedback control completely reduces the deviation e1 to "0." In reality, however, there are influences of an inevitable error, a control delay, and the like, and therefore a predetermined value that can be approximated to "0" is used as a target in executing the feedback control. Thus, in step S8_1, it is determined whether the deviation e1 of the seat front-rear acceleration is equal to "α," i.e., whether the deviation e1 is equal to "0" or the predetermined value that can be approximated to "0."

When the deviation e1 of the seat front-rear acceleration is equal to "α," i.e., the deviation e1 of the seat front-rear acceleration is equal to "0" or the predetermined value that can be approximated to "0," and therefore the determination result of step S8_1 is affirmative, the controller 6 moves to step S8_2 and retains the state of the seat 4. In this case, the actual value of the seat front-rear acceleration is in a state of being controlled so as to adapt well to the target value of the seat front-rear acceleration in the feedback control. Therefore, the controller 6 maintains the state of the seat 4 as is without performing additional PID control (feedback control) in the subsequent seat acceleration control. Thereafter, the controller 6 temporarily ends the seat acceleration control shown in the flowchart of FIG. 13 and the flowchart of FIG. 9.

On the other hand, when the deviation e1 of the seat front-rear acceleration is not equal to "α," i.e., the deviation e1 is not equal to "0" or the predetermined value that can be approximated to "0," and therefore the determination result of step S8_1 is negative, the controller 6 moves to step S8_3.

In step S8_3, it is determined whether the deviation e1 of the seat front-rear acceleration is larger than "α" and moreover the speed Va of the seat 4 in the front-rear direction of the vehicle Ve is lower than "0." When the vehicle Ve accelerates or decelerates while traveling, an acceleration occurs in the direction of an inertial force acting on the seat 4. Therefore, microscopically, the seat 4 shifts in the front-rear direction of the vehicle Ve. In the seat acceleration control in the embodiments of the present disclosure, a shift toward the front side in the front-rear direction of the vehicle Ve and a shift speed thereof are deemed to have positive values, and a shift toward the rear side in the front-rear direction of the vehicle Ve and a shift speed thereof are deemed to have negative values. Therefore, when the deviation e1 of the seat front-rear acceleration is larger than "α" and moreover the speed Va is lower than "0," i.e., the seat 4 is shifting toward the rear side, and therefore the determination result of step S8_3 is affirmative, the controller 6 moves to step S8_4.

In step S8_4, a seat vibration inducing force according to the deviation e1 of the seat front-rear acceleration is output. A seat vibration inducing force is a force that increases the vibration or the acceleration of the seat 4. For example, a seat vibration inducing force is output by controlling the seat suspensions 3 such that vibration transmitted from the chassis 1 to the seat 4 increases. Further, a seat vibration inducing force is output by controlling the seat actuators 13 such that the shift of the seat 4 increases. In this case, the actual value of the seat front-rear acceleration is in a state of being smaller than the target value of the seat front-rear acceleration when the seat 4 shifts toward the rear side, i.e., when the vehicle Ve accelerates while traveling. In step S8_4, therefore, the seat suspensions 3 are controlled such that the shift of the seat 4 toward the rear side increases and that the actual value of the rearward seat front-rear acceleration increases and adapts to the target value. Or each of the seat suspensions 3 and the seat actuators 13 is controlled.

Specifically, the seat suspensions 3 on the front side (FL, FR) and the seat suspensions 3 on the rear side (RL, RR) are controlled so as to be in opposite phases from each other. Similarly, the seat actuators 13 on the front side (FL, FR) and the seat actuators 13 on the rear side (RL, RR) are controlled so as to be in opposite phases from each other. As described above, when the seat actuators 13a, 13b on the front side and the seat actuators 13c, 13d on the rear side are shifted in the vertical direction by different shift amounts, the seat surface 4c of the seat 4 inclines toward the front side or the rear side and the seat 4 shifts in the front-rear direction of the vehicle Ve. In this case, the rearward shift of the seat 4 is increased by making the amplitude of vibration of the seat suspensions 3 on the front side larger than the amplitude of vibration of the seat suspensions 3 on the rear side. Further, the rearward shift of the seat 4 is increased by making the shift amount of the seat actuators 13a, 13b on the front side larger than the shift amount of the seat actuators 13c, 13d on the rear side.

Thus, when the vehicle Ve with the "first sport travel mode" selected accelerates while traveling, the seat 4 is subjected to a rearward seat front-rear acceleration in the acceleration (+) direction that is relatively high so as to correspond to the "first sport travel mode" (e.g., compared with the "soft travel mode"). Therefore, when the vehicle Ve accelerates while traveling, the driver and the passengers on the seats 4 can experience a dynamic or powerful acceleration feel suitable for the "first sport travel mode."

When the "second sport travel mode" or the "aggressive travel mode" is selected as the travel mode of the vehicle Ve, a larger target value of the seat front-rear acceleration is set than when the above-described "first sport travel mode" is selected, so that a higher rearward seat front-rear acceleration occurs in the acceleration (+) direction. Therefore, the driver and the passengers on the seats 4 can experience a more dynamic or more powerful acceleration feel suitable for the "second sport travel mode" or the "aggressive travel mode." Conversely, when the "soft travel mode" is selected as the travel mode of the vehicle Ve, a smaller target value of the seat front-rear acceleration is set than when the above-described "first sport travel mode" is selected. As a result, the rearward seat front-rear acceleration is restricted in the acceleration (+) direction. Therefore, the driver and the passengers on the seats 4 can experience an even and smooth acceleration feel suitable for the "soft travel mode."

When a seat vibration inducing force is thus output in step S8_4, thereafter, the controller 6 temporarily ends the seat acceleration control shown in the flowchart of FIG. 13 and the flowchart of FIG. 9.

On the other hand, when the deviation e1 of the seat front-rear acceleration is smaller than "α" or the speed Va is higher than "0," i.e., the seat 4 is shifting frontward, and therefore the determination result of step S8_3 is negative, the controller 6 moves to step S8_5.

In step S8_5, it is determined whether the deviation e1 of the seat front-rear acceleration is smaller than "α" and moreover the speed Va of the seat 4 in the front-rear direction of the vehicle Ve is higher than "0." When the deviation e1 of the seat front-rear acceleration is smaller than "α" and moreover the speed Va is higher than "0," i.e., the seat 4 is shifting frontward, and therefore the determination result of step S8_5 is affirmative, the controller 6 moves to step S8_6.

In step S8_6, a seat vibration damping force according to the deviation e1 of the seat front-rear acceleration is output. A seat vibration damping force is a force that reduces the vibration or the acceleration of the seat 4. For example, a seat vibration damping force is output by controlling the seat suspensions 3 such that vibration transmitted from the chassis 1 to the seat 4 is restricted. Or a seat vibration damping force is output by controlling the seat actuators 13 such that the shift of the seat 4 decreases. In this case, the actual value (absolute value) of the seat front-rear acceleration is in a state of being larger than the target value (absolute value) of the seat front-rear acceleration when the seat 4 shifts frontward, i.e., when the vehicle Ve decelerates while traveling. In step S8_6, therefore, the seat suspensions 3 are controlled such that the actual value of the frontward seat front-rear acceleration decreases and adapts to the target value while the frontward shift of the seat 4 is restricted. Or each of the seat suspensions 3 and the seat actuators 13 is controlled.

Specifically, the seat suspensions 3 on the front side (FL, FR) and the seat suspensions 3 on the rear side (RL, RR) are controlled so as to be in opposite phases from each other. Similarly, the seat actuators 13 on the front side (FL, FR) and the seat actuators 13 on the rear side (RL, RR) are controlled so as to be in opposite phases from each other. In this case, the frontward shift of the seat 4 is restricted by making the amplitude of vibration of the seat suspensions 3 on the front side larger than the amplitude of vibration of the seat suspensions 3 on the rear side. Further, the frontward shift of the seat 4 is restricted by making the shift amount of the seat actuators 13a, 13b on the front side larger than the shift amount of the seat actuators 13c, 13d on the rear side.

Therefore, when the vehicle Ve with the "first sport travel mode" selected decelerates while traveling, the seat 4 is subjected to a frontward seat front-rear acceleration in the deceleration (−) direction that is relatively high so as to correspond to the "first sport travel mode" (e.g., compared with the "soft travel mode"). This frontward seat front-rear acceleration is an acceleration in the deceleration direction (a deceleration) that is moderately restricted. Therefore, when the vehicle Ve decelerates while traveling, the driver and the passengers on the seats 4 can experience a dynamic and moderately restricted deceleration feel suitable for the "first sport travel mode."

When the "second sport travel mode" or the "aggressive travel mode" is selected as the travel mode of the vehicle Ve, a larger target value of the seat front-rear acceleration is set than when the above-described "first sport travel mode" is selected, so that a higher frontward seat front-rear acceleration occurs in the deceleration (−) direction. Therefore, the driver and the passengers on the seats 4 can experience a more dynamic and yet moderately restricted deceleration feel suitable for the "second sport travel mode" or the "aggressive travel mode." Conversely, when the "soft travel mode" is selected as the travel mode of the vehicle Ve, a smaller target value of the seat front-rear acceleration is set than when the above-described "first sport travel mode" is selected. As a result, the frontward seat front-rear acceleration is restricted in the deceleration (−) direction. Therefore, the driver and the passengers on the seats 4 can experience an even and smooth deceleration feel suitable for the "soft travel mode."

When a seat vibration damping force is thus output in step S8_6, thereafter, the controller 6 temporarily ends the seat acceleration control shown in the flowchart of FIG. 13 and the flowchart of FIG. 9.

On the other hand, when the deviation e1 of the seat front-rear acceleration is larger than "α" or the speed Va is lower than "0," i.e., the seat 4 is shifting rearward, and therefore the determination result of step S8_5 is negative, the controller 6 moves to step S8_7.

In step S8_7, it is determined whether the deviation e1 of the seat front-rear acceleration is larger than "α" and moreover the speed Va of the seat 4 in the front-rear direction of the vehicle Ve is higher than "0." When the deviation e1 of the seat front-rear acceleration is larger than "α" and moreover the speed Va is higher than "0," i.e., the seat 4 is shifting frontward, and therefore the determination result of step S8_7 is affirmative, the controller 6 moves to step S8_8.

In step S8_8, a seat vibration inducing force according to the deviation e1 of the seat front-rear acceleration is output. For example, a seat vibration inducing force is output by controlling the seat suspensions 3 such that vibration transmitted from the chassis 1 to the seat 4 increases. Further, a seat vibration inducing force is output by controlling the seat actuators 13 such that the shift of the seat 4 increases. In this case, the actual value (absolute value) of the seat front-rear acceleration is in a state of being smaller than the target value (absolute value) of the seat front-rear acceleration when the seat 4 shifts frontward, i.e., when the vehicle Ve decelerates while traveling. In step S8_8, therefore, the seat suspensions 3 are controlled such that the frontward shift of the seat 4 increases and that the actual value (absolute value) of the frontward seat front-rear acceleration increases and adapts to the target value (absolute value). Or each of the seat suspensions 3 and the seat actuators 13 is controlled.

Specifically, the seat suspensions 3 on the front side (FL, FR) and the seat suspensions 3 on the rear side (RL, RR) are controlled so as to be in opposite phases from each other. Similarly, the seat actuators 13 on the front side (FL, FR) and the seat actuators 13 on the rear side (RL, RR) are controlled so as to be in opposite phases from each other. In this case, the frontward shift of the seat 4 is increased by making the amplitude of vibration of the seat suspensions 3 on the rear side larger than the amplitude of vibration of the seat suspensions 3 on the front side. Further, the frontward shift of the seat 4 is increased by making the shift amount of the seat actuators 13c, 13d on the rear side larger than the shift amount of the seat actuators 13a, 13b on the front side.

Therefore, when the vehicle Ve with the "first sport travel mode" selected decelerates while traveling, the seat 4 is subjected to a frontward seat front-rear acceleration in the deceleration (−) direction that is relatively high so as to correspond to the "first sport travel mode" (e.g., compared with the "soft travel mode"). This frontward seat front-rear acceleration is an acceleration in the deceleration direction (a deceleration) that is moderately restricted. Therefore, when the vehicle Ve decelerates while traveling, the driver and the passengers on the seats 4 can experience a dynamic or powerful deceleration feel suitable for the "first sport travel mode."

When the "second sport travel mode" or the "aggressive travel mode" is selected as the travel mode of the vehicle Ve, a larger target value (absolute value) of the seat front-rear acceleration is set than when the above-described "first sport travel mode" is selected, so that a higher frontward seat front-rear acceleration occurs in the deceleration (−) direction. Therefore, the driver and the passengers on the seats 4 can experience a more dynamic or more powerful deceleration feel suitable for the "second sport travel mode" or the "aggressive travel mode." Conversely, when the "soft travel mode" is selected as the travel mode of the vehicle Ve, a smaller target value (absolute value) of the seat front-rear acceleration is set than when the above-described "first sport travel mode" is selected. As a result, the frontward seat front-rear acceleration is restricted in the deceleration (−) direction. Therefore, the driver and the passengers on the seats 4 can experience an even and smooth deceleration feel suitable for the "soft travel mode."

When a seat vibration inducing force is thus output in step S8_8, thereafter, the controller 6 temporarily ends the seat acceleration control shown in the flowchart of FIG. 13 and the flowchart of FIG. 9.

When the deviation e1 of the seat front-rear acceleration is smaller than "α" or the speed Va is lower than "0," i.e., the seat 4 is shifting rearward, and therefore the determination result of step S8_7 is negative, the controller 6 moves to step S8_9.

In step S8_9, a seat vibration damping force according to the deviation e1 of the seat front-rear acceleration is output. For example, a seat vibration damping force is output by controlling the seat suspensions 3 such that vibration transmitted from the chassis 1 to the seat 4 is restricted. Further, a seat vibration damping force is output by controlling the seat actuators 13 such that the shift of the seat 4 decreases. In this case, the actual value of the seat front-rear acceleration is in a state of being larger than the target value of the seat front-rear acceleration when the seat 4 shifts rearward, i.e., when the vehicle Ve accelerates while traveling. In step S8_9, therefore, the seat suspensions 3 are controlled such that the rearward shift of the seat 4 is restricted and that the actual value of the rearward seat front-rear acceleration decreases and adapts to the target value. Or each of the seat suspensions 3 and the seat actuators 13 is controlled.

Specifically, the seat suspensions 3 on the front side (FL, FR) and the seat suspensions 3 on the rear side (RL, RR) are controlled so as to be in opposite phases from each other. Similarly, the seat actuators 13 on the front side (FL, FR) and the seat actuators 13 on the rear side (RL, RR) are controlled so as to be in opposite phases from each other. In this case, the rearward shift of the seat 4 is restricted by making the amplitude of vibration of the seat suspensions 3 on the rear side larger than the amplitude of vibration of the seat suspensions 3 on the front side. Further, the rearward shift of the seat 4 is restricted by making the shift amount of the seat actuators 13c, 13d on the rear side larger than the shift amount of the seat actuators 13a, 13b on the front side.

Therefore, when the vehicle Ve with the "first sport travel mode" selected decelerates while traveling, the seat 4 is subjected to a rearward seat front-rear acceleration in the acceleration (+) direction that is relatively high so as to correspond to the "first sport travel mode" (e.g., compared with the "soft travel mode"). This rearward seat front-rear acceleration is a moderately restricted acceleration in the acceleration direction. Therefore, when the vehicle Ve accelerates while traveling, the driver and the passengers on the seats 4 can experience a dynamic and moderately restricted acceleration feel suitable for the "first sport travel mode."

When the "second sport travel mode" or the "aggressive travel mode" is selected as the travel mode of the vehicle Ve, a larger target value of the seat front-rear acceleration is set than when the above-described "first sport travel mode" is selected, so that a higher rearward seat front-rear acceleration occurs in the acceleration (+) direction. Therefore, the driver and the passengers on the seats 4 can experience a more dynamic and yet moderately restricted acceleration feel suitable for the "second sport travel mode" or the "aggressive travel mode." Conversely, when the "soft travel mode" is selected as the travel mode of the vehicle Ve, a smaller target value of the seat front-rear acceleration is set than when the above-described "first sport travel mode" is selected. As a result, the rearward seat front-rear acceleration is restricted in the acceleration (+) direction. Therefore, the driver and the passengers on the seats 4 can experience an even and smooth acceleration feel suitable for the "soft travel mode."

When a seat vibration damping force is thus output in step S8_9, thereafter, the controller 6 temporarily ends the seat acceleration control shown in the flowchart of FIG. 13 and the flowchart of FIG. 9.

Figure 10:
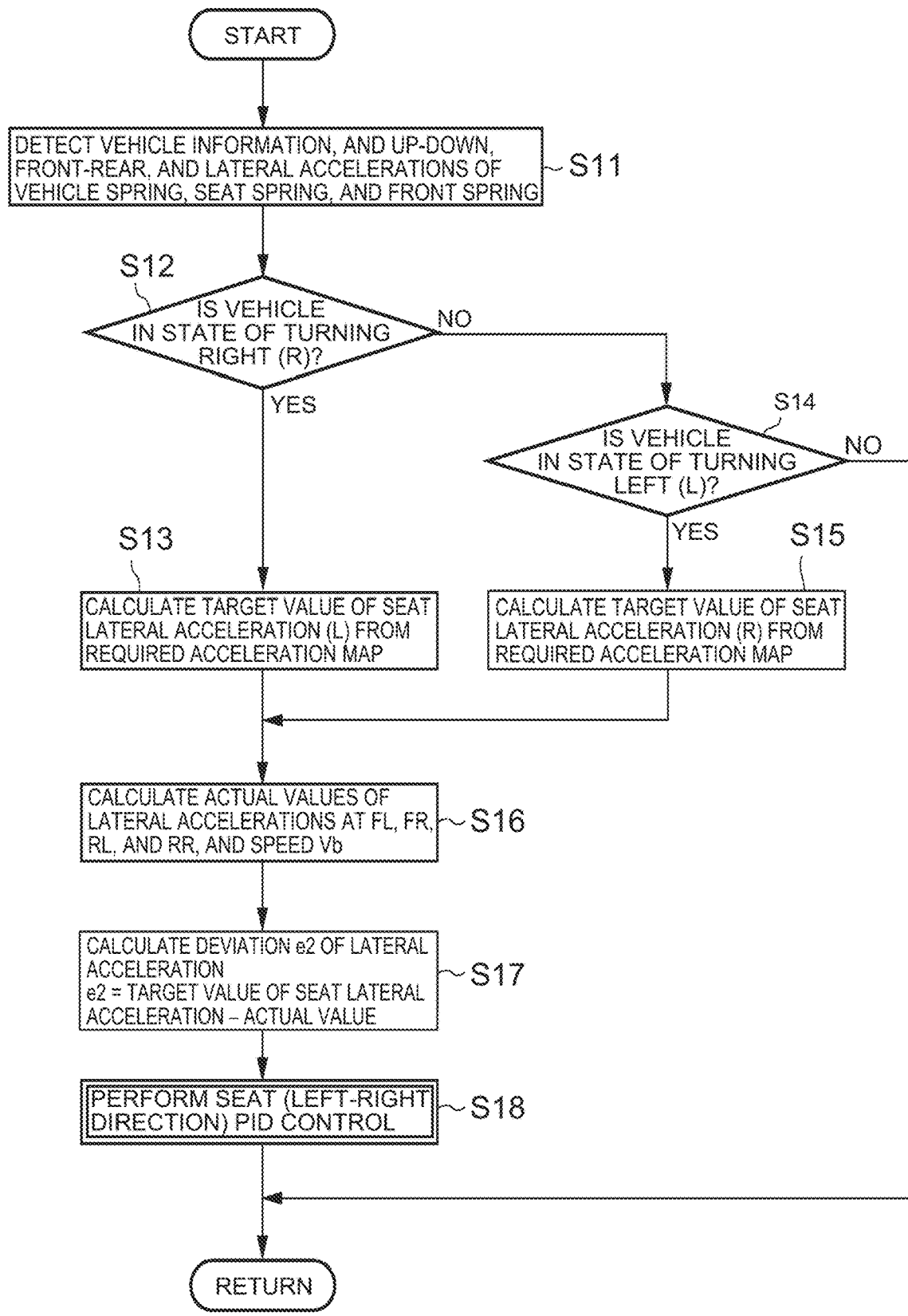
FIG. 10 is a flowchart illustrating basic control contents of the "seat acceleration control" executed by the vehicle control device of the present disclosure, and showing control contents of the "seat acceleration control" that is executed when the vehicle turns while traveling.

The flowchart of FIG. 10 shows the seat acceleration control that is executed when the vehicle Ve turns while traveling. In the seat acceleration control shown in the flowchart of FIG. 10, first, in step S11, the vehicle information relating to the travel state of the vehicle Ve, the state of operation of the vehicle Ve by the driver, etc. is detected. As such vehicle information, for example, the vehicle speed, the acceleration in the front-rear direction of the vehicle Ve (the vehicle front-rear acceleration), the acceleration in the left-right direction of the vehicle Ve (the vehicle lateral acceleration), the acceleration in the up-down direction (vertical direction) of the vehicle Ve (the vehicle up-down acceleration), the state of acceleration operation by the driver (e.g., the operation amount and the operation speed of the accelerator pedal), the state of deceleration operation by the driver (e.g., the operation amount and the operation speed of the brake pedal), and the state of steering by the driver (e.g., the operation amount and the operation speed of the steering wheel) are detected. Further, the unsprung vehicle acceleration of the vehicle suspension 2 at the unsprung vehicle part 9, the sprung vehicle acceleration of the vehicle suspension 2 at the sprung vehicle part 8, the upsprung seat acceleration of the seat suspension 3 at the unsprung seat part 10, the sprung seat acceleration of the seat suspension 3 at the sprung seat part 11, the acceleration of the seat 4 in the front-rear direction of the vehicle Ve (the seat front-rear acceleration), the acceleration of the seat 4 in the left-right direction of the vehicle Ve (the seat lateral acceleration), the shift of the seat 4 in the up-down direction (vertical direction) of the vehicle Ve, etc. are detected. Then, each of these detection values is read into the controller 6.

Next, in step S12, it is determined whether the vehicle Ve is in a state of turning right while traveling. For example, it is determined whether the steering wheel is being operated in a right-turn direction by an operation amount (or a steering angle) equal to or larger than a predetermined value. It is determined that the vehicle Ve is in the state of turning right while traveling, when a detection value of the steering angle sensor 5n shows an operation amount or a steering angle in the right-turn direction that is equal to or larger than the predetermined value.

When it is determined that the vehicle Ve is in the state of turning right while traveling, and therefore the determination result of step S12 is affirmative, the controller 6 moves to step S13.

In step S13, a target value of the acceleration of the seat 4 in the left-right direction of the vehicle Ve (the seat lateral acceleration) when the vehicle Ve turns while traveling is calculated from the required acceleration map. In this case, the target value of the acceleration in a right-turn (R) direction is calculated for the seat lateral acceleration. As shown in FIG. 12, the required acceleration map is a map that is used to obtain the required acceleration for the seat lateral acceleration (the target value of the seat lateral acceleration) from the relationship between the vehicle speed and the operation amount (steering angle) of the steering wheel.

On the other hand, when it is determined that the vehicle Ve is not in the state of turning right while traveling, and therefore the determination result of step S12 is negative, the controller 6 moves to step S14.

In step S14, it is determined whether the vehicle Ve is in a state of turning left while traveling. For example, it is determined whether the steering wheel is being operated in a left-turn direction by an operation amount (or a steering angle) that is equal to or larger than a predetermined value. It is determined that the vehicle Ve is in the state of turning left while traveling, when a detection value of the steering angle sensor 5n shows an operation amount or a steering angle in the left-turn direction that is equal to or larger than the predetermined value.

When it is determined that the vehicle Ve is in the state of turning left while traveling, and therefore the determination result of step S14 is affirmative, the controller 6 moves to step S15. When it is determined that the vehicle Ve is not in the state of turning left while traveling, and therefore the determination result of step S14 is negative, it can be determined that the vehicle Ve is in a state of traveling straight or in a stationary state. In this case, therefore, the controller 6 temporarily ends the seat acceleration control shown in the flowchart of FIG. 10 without executing the subsequent control.

In step S15, a target value of the seat lateral acceleration when the vehicle Ve turns left while traveling is calculated from the required acceleration map. In this case, a target value of the acceleration in a left-turn (L) direction for the seat lateral acceleration is calculated.

When the required acceleration for the seat lateral acceleration (the target value of the seat lateral acceleration) is calculated in step S13 or step S15, the controller 6 moves to step S16.

In step S16, the actual value of the seat lateral acceleration and a speed Vb are calculated. The actual value of the seat lateral acceleration can be calculated, for example, from detection values of the respective seat shift sensors 5g that are respectively provided on the left front side (FL), the right front side (FR), the left rear side (RL), and the right rear side (RR) of the seat 4. Or the actual value may be directly obtained from a detection value of the seat lateral acceleration sensor 5f. The speed Vb is a shift speed of the seat 4 in the left-right direction of the vehicle Ve, and can be calculated, for example, based on the actual value of the seat lateral acceleration calculated as described above. Or the speed Vb may be obtained from the detection value of the seat lateral acceleration sensor 5f by back calculation.

Next, in step S17, a deviation e2 of the seat lateral acceleration is calculated. The deviation e2 is a deviation used in feedback control, and is used to execute PID control in the next seat acceleration control. The deviation e2 is the difference between the target value of the seat lateral acceleration and the actual value of the seat lateral acceleration. Specifically, the deviation e2 is calculated from the following calculation formula:

$$\text{Deviation } e2 = \text{target value of seat lateral acceleration} - \text{actual value of seat lateral acceleration}$$

Figure 14:
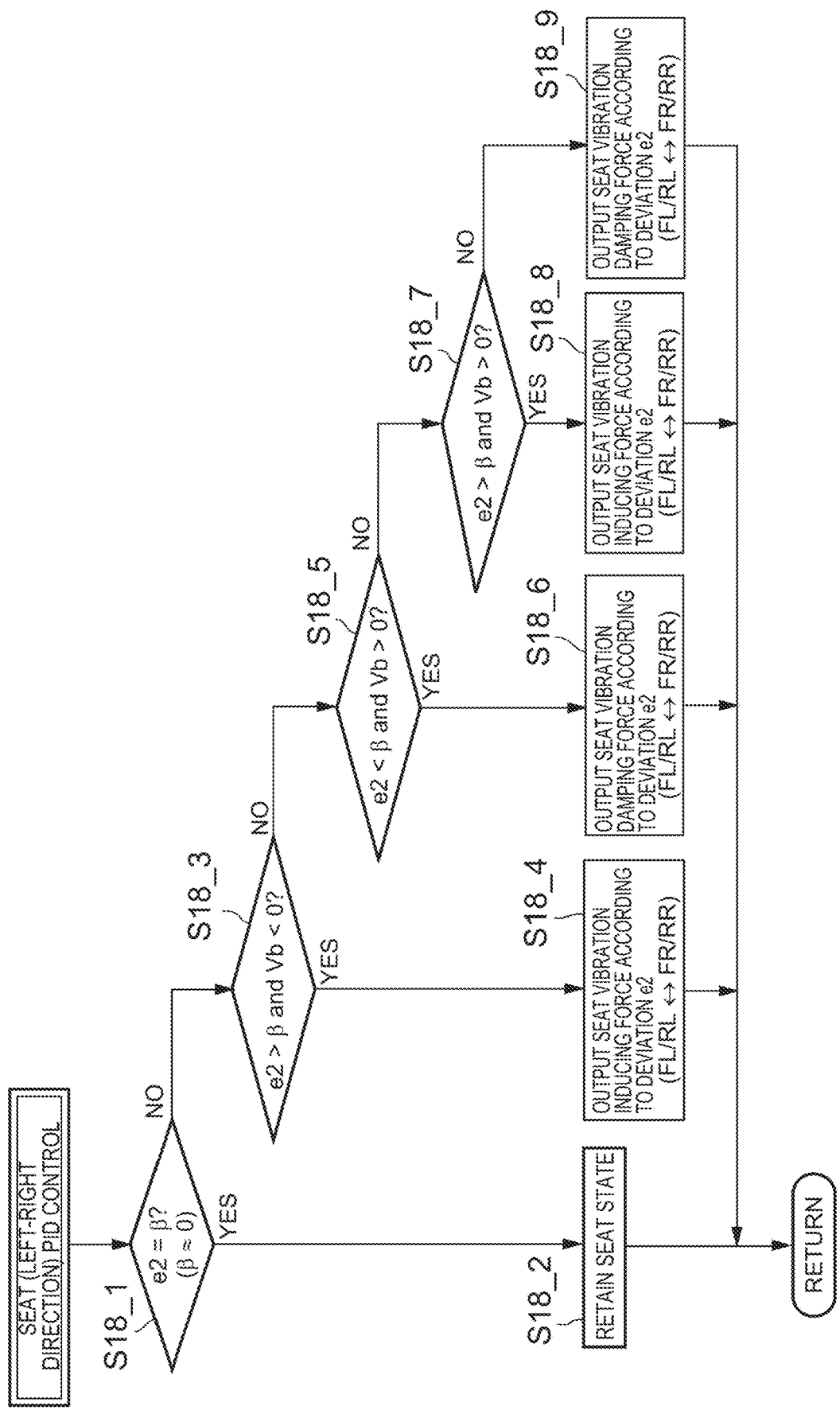
FIG. 14 is a flowchart illustrating detailed control contents of "seat (left-right direction) PID control" executed in step S15 of the "seat acceleration control" shown in the flowchart of FIG. 10.

In step S18, PID control in the seat acceleration control is executed. That is, seat acceleration control using a control method of PID control is executed. Detailed control contents of the seat acceleration control (left-right direction) executed in step S18 are shown in the flowchart of FIG. 14.

First, in step S18_1, it is determined whether the deviation e2 of the seat lateral acceleration is equal to "β." Here, "β" is a predetermined value that can be approximated to "0." As described above, the deviation e2 is a deviation used in the feedback control, and ideal feedback control completely reduces the deviation e2 to "0." In reality, however, there are influences of an inevitable error, a control delay, and the like, and therefore a predetermined value that can be approximated to "0" is used as a target in executing the feedback control. Thus, in step S18_1, it is determined whether the deviation e2 of the seat lateral acceleration is equal to "β," i.e., whether the deviation e2 is equal to "0" or the predetermined value that can be approximated to "0."

When the deviation e2 of the seat lateral acceleration is equal to "β," i.e., the deviation e2 of the seat lateral acceleration is equal to "0" or the predetermined value that can be approximated to "0," and therefore the determination result of step S18_1 is affirmative, the controller 6 moves to step S18_2 and retains the state of the seat 4. In this case, the actual value of the seat lateral acceleration is in a state of being controlled so as to adapt well to the target value of the seat lateral acceleration in the feedback control. Therefore, the controller 6 maintains the state of the seat 4 as is without performing additional PID control (feedback control) in the subsequent seat acceleration control. Thereafter, the controller 6 temporarily ends the seat acceleration control shown in the flowchart of FIG. 14 and the flowchart of FIG. 10.

On the other hand, when the deviation e2 of the seat lateral acceleration is not equal to "β," i.e., the deviation e2 is not equal to "0" or the predetermined value that can be approximated to "0," and therefore the determination result of step S18_1 is negative, the controller 6 moves to step S18_3.

In step S18_3, it is determined whether the deviation e2 of the seat lateral acceleration is larger than "β" and moreover the speed Vb of the seat 4 in the left-right direction of the vehicle Ve is lower than "0." When the vehicle Ve turns while traveling, an acceleration occurs in the direction of a centrifugal force acting on the seat 4. Therefore, microscopically, the seat 4 shifts in the direction in which the centrifugal force acts. In this case, a component in the left-right direction of the vehicle Ve occurs in the vector of the shift of the seat 4. Therefore, the seat 4 shifts in the left-right direction of the vehicle Ve. In the seat acceleration control in the embodiments of the present disclosure, a shift toward the left side in the left-right direction of the vehicle Ve and the shift speed thereof are deemed to have positive values, and a shift toward the right side in the left-right direction of the vehicle Ve and the shift speed thereof are deemed to have negative values. Specifically, when the vehicle Ve turns right while traveling, the seat 4 shifts toward the left side, i.e., in a positive direction. Conversely, when the vehicle Ve turns left while traveling, the seat 4 shifts toward the right side, i.e., in a negative direction. Therefore, when the deviation e2 of the seat lateral acceleration is larger than "β" and moreover the speed Vb is lower than "0," i.e., the seat 4 is shifting toward the right side, and therefore the determination result of step S18_3 is affirmative, the controller 6 moves to step S18_4.

In step S18_4, a seat vibration inducing force according to the deviation e2 of the seat lateral acceleration is output. For example, a seat vibration inducing force is output by controlling the seat suspensions 3 such that vibration transmitted from the chassis 1 to the seat 4 increases. Further, a seat vibration inducing force is output by controlling the seat actuators 13 such that the shift of the seat 4 increases. In this case, the actual value (absolute value) of the seat lateral acceleration is in a state of being smaller than the target value (absolute value) of the seat lateral acceleration when the seat 4 shifts toward the right side, i.e., when the vehicle Ve turns left while traveling. In step S18_4, therefore, the seat suspensions 3 are controlled such that the rightward shift of the seat 4 increases and that the actual value of the rightward seat lateral acceleration increases and adapts to the target value. Or each of the seat suspensions 3 and the seat actuators 13 is controlled.

Specifically, the seat suspensions 3 on the left side (FL, RL) and the seat suspensions 3 on the right side (FR, RR) are controlled so as to be in opposite phases from each other. Similarly, the seat actuators 13 on the left side (FL, RL) and the seat actuators 13 on the right side (FR, RR) are controlled so as to be in opposite phases from each other. As described above, when the seat actuators 13$a$, 13$c$ on the left side and the seat actuators 13$b$, 13$d$ on the right side are shifted in the vertical direction by different shift amounts, the seat surface 4$c$ of the seat 4 inclines toward the left side or the right side and the seat 4 shifts in the left-right direction of the vehicle Ve. In this case, the rightward shift of the seat 4 is increased by making the amplitude of vibration of the seat suspensions 3 on the left side larger than the amplitude of vibration of the seat suspensions 3 on the right side. Further, the rightward shift of the seat 4 is increased by making the shift amount of the seat actuators 13$a$, 13$c$ on the left side larger than the shift amount of the seat actuators 13$b$, 13$d$ on the right side.

Thus, when the vehicle Ve with the "first sport travel mode" selected turns left while traveling, the seat 4 is subjected to a rightward (R) seat lateral acceleration in the acceleration direction that is relatively high so as to correspond to the "first sport travel mode" (e.g., compared with the "soft travel mode"). Therefore, when the vehicle Ve turns left while traveling, the driver and the passengers on the seats 4 can experience a dynamic or prompt steering feel suitable for "first sport travel mode."

When the "second sport travel mode" or the "aggressive travel mode" is selected as the travel mode of the vehicle Ve, a larger target value of the seat lateral acceleration is set than when the above-described "first sport travel mode" is selected, so that a higher rightward seat lateral acceleration occurs in the acceleration direction. Therefore, the driver and the passengers on the seats 4 can experience a more dynamic or more prompt steering feel suitable for the "second sport travel mode" or the "aggressive travel mode." Conversely, when the "soft travel mode" is selected as the travel mode of the vehicle Ve, a smaller target value of the seat lateral acceleration is set than when the above-described "first sport travel mode" is selected. As a result, the rightward seat lateral acceleration is restricted in the acceleration direction. Thus, the driver and the passengers on the seats 4 can experience an even and smooth steering feel suitable for the "soft travel mode," with the centrifugal force restricted.

When a seat vibration inducing force is thus output in step S18_4, thereafter, the controller 6 temporarily ends the seat acceleration control shown in the flowchart of FIG. 14 and the flowchart of FIG. 10.

On the other hand, when the deviation e2 of the seat lateral acceleration is smaller than "β" or the speed Vb is higher than "0," i.e., the seat 4 is shifting toward the left side, and therefore the determination result of step S18_3 is negative, the controller 6 moves to step S18_5.

In step S18_5, it is determined whether the deviation e2 of the seat lateral acceleration is smaller than "β" and moreover the speed Vb of the seat 4 in the left-right direction of the vehicle Ve is higher than "0." When the deviation e2 of the seat lateral acceleration is smaller than "β" and moreover the speed Vb is higher than "0," i.e., the seat 4 is shifting toward the left side, and therefore the determination result of step S18_5 is affirmative, the controller 6 moves to step S18_6.

In step S18_6, a seat vibration damping force according to the deviation e2 of the seat lateral acceleration is output. For example, a seat vibration damping force is output by controlling the seat suspensions 3 such that vibration transmitted from the chassis 1 to the seat 4 decreases. Or a seat vibration damping force is output by controlling the seat actuators 13 such that the shift of the seat 4 decreases. In this case, the actual value of the seat lateral acceleration is in a state of being larger than the target value of the seat lateral acceleration when the seat 4 shifts toward the left side, i.e., when the vehicle Ve turns right while traveling. In step S18_6, therefore, the seat suspensions 3 are controlled such that the actual value of the leftward seat lateral acceleration decreases and adapts to the target value while the shift of the seat 4 toward the left side is restricted. Or each of the seat suspensions 3 and the seat actuators 13 is controlled.

Specifically, the seat suspensions 3 on the left side (FL, RL) and the seat suspensions 3 on the right side (FR, RR) are controlled so as to be in opposite phases from each other. Similarly, the seat actuators 13 on the left side (FL, RL) and the seat actuators 13 on the right side (FR, RR) are controlled so as to be in opposite phases from each other. In this case, the leftward shift of the seat 4 is restricted by making the amplitude of vibration of the seat suspensions 3 on the left side larger than the amplitude of vibration of the seat suspensions 3 on the right side. Further, the leftward shift of the seat 4 is restricted by making the shift amount of the seat actuators 13$a$, 13$c$ on the left side larger than the shift amount of the seat actuators 13$b$, 13$d$ on the right side.

Therefore, when the vehicle Ve with the "first sport travel mode" selected turns right while traveling, the seat 4 is subjected to a leftward seat lateral acceleration in the acceleration direction that is relatively high so as to correspond to the "first sport travel mode" (e.g., compared with the "soft travel mode"). This leftward seat lateral acceleration is an acceleration that is moderately restricted. Therefore, when the vehicle Ve turns right while traveling, the driver and the passengers on the seats 4 can experience a dynamic and moderately restricted prompt steering feel suitable for the "first sport travel mode."

When the "second sport travel mode" or the "aggressive travel mode" is selected as the travel mode of the vehicle Ve, a larger target value of the seat lateral acceleration is set than when the above-described "first sport travel mode" is selected, so that a higher leftward seat lateral acceleration occurs in the acceleration direction. Therefore, the driver and the passengers on the seats 4 can experience a more dynamic and yet moderately restricted prompt steering feel suitable for the "second sport travel mode" or the "aggressive travel mode." Conversely, when the "soft travel mode" is selected as the travel mode of the vehicle Ve, a smaller target value of the seat lateral acceleration is set than when the above-described "first sport travel mode" is selected. As a result, the leftward seat lateral acceleration is restricted in the acceleration direction. Therefore, the driver and the passengers on the seats 4 can experience an even and smooth steering feel suitable for the "soft travel mode," with the centrifugal force restricted.

When a seat vibration damping force is thus output in step S18_6, thereafter, the controller 6 temporarily ends the seat acceleration control shown in the flowchart of FIG. 14 and the flowchart of FIG. 10.

On the other hand, when the deviation e2 of the seat lateral acceleration is larger than "β" or the speed Vb is lower than "0," i.e., the seat 4 is shifting toward the right side, and therefore the determination result of step S18_5 is negative, the controller 6 moves to step S18_7.

In step S18_7, it is determined whether the deviation e2 of the seat lateral acceleration is larger than "β" and moreover the speed Vb of the seat 4 in the left-right direction of the vehicle Ve is higher than "0." When the deviation e2 of the seat lateral acceleration is larger than "β" and moreover the speed Vb is higher than "0," i.e., the seat 4 is shifting toward the left side, and therefore the determination result of step S18_7 is affirmative, the controller 6 moves to step S18_8.

In step S18_8, a seat vibration inducing force according to the deviation e2 of the seat lateral acceleration is output. For example, a seat vibration inducing force is output by controlling the seat suspensions 3 such that vibration transmitted from the chassis 1 to the seat 4 increases. Further, a seat vibration inducing force is output by controlling the seat actuators 13 such that the shift of the seat 4 increases. In this case, the actual value of the seat lateral acceleration is in a state of being smaller than the target value of the seat lateral acceleration when the seat 4 shifts toward the left side, i.e., when the vehicle Ve turns right while traveling. In step S18_8, therefore, the seat suspensions 3 are controlled such that the shift of the seat 4 toward the left side increases and that the actual value of the leftward seat lateral acceleration increases and adapts to the target value. Or each of the seat suspensions 3 and the seat actuators 13 is controlled.

Specifically, the seat suspensions 3 on the left side (FL, RL) and the seat suspensions 3 on the right side (FR, RR) are controlled so as to be in opposite phases from each other. Similarly, the seat actuators 13 on the left side (FL, RL) and the seat actuators 13 on the right side (FR, RR) are controlled so as to be in opposite phases from each other. In this case, the leftward shift of the seat 4 is increased by making the amplitude of vibration of the seat suspensions 3 on the right side larger than the amplitude of vibration of the seat suspensions 3 on the left side. Further, the leftward shift of the seat 4 is increased by making the shift amount of the seat actuators 13b, 13d on the right side larger than the shift amount of the seat actuators 13a, 13c on the left side.

Thus, when the vehicle Ve with the "first sport travel mode" selected turns right while traveling, the seat 4 is subjected to a leftward (L) seat lateral acceleration in the acceleration direction that is relatively high so as to correspond to the "first sport travel mode" (e.g., compared with the "soft travel mode"). Therefore, when the vehicle Ve turns right while traveling, the driver and the passengers on the seats 4 can experience a dynamic or prompt steering feel suitable for the "first sport travel mode."

When the "second sport travel mode" or the "aggressive travel mode" is selected as the travel mode of the vehicle Ve, a larger target value of the seat lateral acceleration is set than when the above-described "first sport travel mode" is selected, so that a higher leftward seat lateral acceleration occurs in the acceleration direction. Therefore, the driver and the passengers on the seats 4 can experience a more dynamic or more prompt steering feel suitable for the "second sport travel mode" or the "aggressive travel mode." Conversely, when the "soft travel mode" is selected as the travel mode of the vehicle Ve, a smaller target value of the seat lateral acceleration is set than when the above-described "first sport travel mode" is selected. As a result, the leftward seat lateral acceleration is restricted in the acceleration direction. Therefore, the driver and the passengers on the seats 4 can experience an even and smooth steering feel suitable for the "soft travel mode," with the centrifugal force restricted.

When a seat vibration inducing force is thus output in step S18_8, thereafter, the controller 6 temporarily ends the seat acceleration control shown in the flowchart of FIG. 14 and the flowchart of FIG. 10.

When the deviation e2 of the seat lateral acceleration is smaller than "β" or the speed Vb is lower than "0," i.e., the seat 4 is shifting toward the right side, and therefore the determination result of step S18_7 is negative, the controller 6 moves to step S18_9.

In step S18_9, a seat vibration damping force according to the deviation e2 of the seat lateral acceleration is output. For example, a seat vibration damping force is output by controlling the seat suspensions 3 such that vibration transmitted from the chassis 1 to the seat 4 is restricted. Further, a seat vibration damping force is output by controlling the seat actuators 13 such that the shift of the seat 4 decreases. In this case, the actual value (absolute value) of the seat lateral acceleration is in a state of being larger than the target value (absolute value) of the seat lateral acceleration when the seat 4 shifts toward the right side, i.e., when the vehicle Ve turns left while traveling. In step S18_9, therefore, the seat suspensions 3 are controlled such that the actual value of the rightward seat lateral acceleration decreases and adapts to the target value while the shift of the seat 4 toward the right side is restricted. Or each of the seat suspensions 3 and the seat actuators 13 is controlled.

Specifically, the seat suspensions 3 on the left side (FL, RL) and the seat suspensions 3 on the right side (FR, RR) are controlled so as to be in opposite phases from each other. Similarly, the seat actuators 13 on the left side (FL, RL) and the seat actuators 13 on the right side (FR, RR) are controlled so as to be in opposite phases from each other. In this case, the rightward shift of the seat 4 is restricted by making the amplitude of vibration of the seat suspensions 3 on the right side larger than the amplitude of vibration of the seat suspensions 3 on the left side. Further, the rightward shift of the seat 4 is restricted by making the shift amount of the seat actuators 13b, 13d on the right side larger than the shift amount of the seat actuators 13a, 13c on the left side.

Therefore, when the vehicle Ve with the "first sport travel mode" selected turns left while traveling, the seat 4 is subjected to a rightward seat lateral acceleration in the acceleration direction that is relatively high so as to correspond to the "first sport travel mode" (e.g., compared with the "soft travel mode"). This rightward seat lateral acceleration is a moderately restricted acceleration. Therefore, when the vehicle Ve turns left while traveling, the driver and the passengers on the seats 4 can experience a dynamic and moderately restricted prompt steering feel suitable for the "first sport travel mode."

When the "second sport travel mode" or the "aggressive travel mode" is selected as the travel mode of the vehicle Ve, a larger target value of the seat lateral acceleration is set than when the above-described "first sport travel mode" is selected, so that a higher rightward seat lateral acceleration occurs in the acceleration direction. Therefore, the driver and the passengers on the seats 4 can experience a more dynamic and yet moderately restricted prompt steering feel suitable for the "second sport travel mode" or the "aggressive travel mode." Conversely, when the "soft travel mode"

is selected as the travel mode of the vehicle Ve, a smaller target value of the seat lateral acceleration is set than when the above-described "first sport travel mode" is selected. As a result, the rightward seat lateral acceleration is restricted in the acceleration direction. Therefore, the driver and the passengers on the seats 4 can experience an even and smooth steering feel suitable for the "soft travel mode," with the centrifugal force restricted.

When a seat vibration damping force is thus output in step S18_9, thereafter, the controller 6 temporarily ends the seat acceleration control shown in the flowchart of FIG. 14 and the flowchart of FIG. 10.

When executing the seat acceleration control as shown in FIG. 9, FIG. 10, FIG. 13, and FIG. 14 described above, the vehicle suspensions 2 are basically set toward improving the steering stability performance of the vehicle Ve, i.e., toward hardening the vehicle suspensions 2. Or when the vehicle suspensions 15 that are so-called "active suspensions" are used, the vehicle suspensions 15 are basically controlled toward improving the steering stability performance of the vehicle Ve, i.e., toward hardening the vehicle suspensions 15. The vehicle suspensions 15 may be controlled based on the vehicle information, and the seat suspensions 3 and the vehicle suspensions 15 may be controlled in a coordinated manner according to the selected travel mode. Or the seat suspensions 3 and the seat actuators 13, and the vehicle suspensions 15 may be controlled in a coordinated manner.

The basic steering stability performance of the vehicle Ve is secured by the setting of the vehicle suspensions 2 or the control of the vehicle suspensions 15 as described above. At the same time, the ride comfort performance and the steering stability performance of the vehicle Ve according to the selected travel mode are delivered by the seat acceleration control as described above. Therefore, the mutually contradictory vehicle characteristics of the ride comfort performance and the steering stability performance of the vehicle Ve can be made compatible with each other, and also the vehicle characteristics can be appropriately controlled according to the driving preference and intention of the driver.

When the vehicle Ve includes, as a drive power source, a motor (not shown) capable of regenerative control during deceleration travel, the vehicle control device in the embodiments of the present disclosure can increase the regenerative power generated by the motor. Specifically, when the vehicle Ve decelerates while traveling, the vehicle control device in the embodiments of the present disclosure controls the vehicle suspensions 15 so as to change each of the spring constant of the vehicle springs 15a and the damping coefficient of the vehicle dampers 15b in the vehicle suspensions 15 in such a direction that the ground contact load of the tires increase. Thus, during deceleration travel of the vehicle Ve equipped with the motor as described above, as the ground contact load of the tires increases, the regenerative power generated when the motor is under regenerative control increases accordingly. Therefore, the vehicle control device in the embodiments of the present disclosure can improve the energy efficiency (electricity efficiency) of a hybrid electric vehicle or a battery electric vehicle equipped with a motor as described above as a drive power source, and can, by extension, cut the emission of greenhouse gas ($CO_2$ gas).

The vehicle Ve to be controlled by the vehicle control device in the embodiments of the present disclosure may further include, for example, an antilock braking system (not shown) or a traction control system (not shown). In this case, the vehicle control device in the embodiments of the present disclosure controls the vehicle suspensions 15 such that the ground contact load of the tires increases when the antilock braking system is activated or when the traction control system is activated. That is, as with the case of the regenerative control of the motor during deceleration travel as described above, the vehicle suspensions 15 are controlled so as to change each of the spring constant of the vehicle springs 15a and the damping coefficient of the vehicle dampers 15b in the vehicle suspensions 15 in such a direction that the ground contact load of the tires increases. Therefore, the vehicle control device in the embodiments of the present disclosure can further improve the behavioral stability of a vehicle having an antilock braking system or a traction control system.

For the vehicle Ve to be controlled that is equipped with a stepped transmission (not shown), the vehicle control device in the embodiments of the present disclosure can virtually produce shift shock upon gear change and behavior of the stepped transmission. Specifically, the vehicle control device in the embodiments of the present disclosure changes the acceleration of the seat 4 according to the actual shift shock of the stepped transmission (fluctuations in the front-rear acceleration of the vehicle Ve). For example, as shown in the time chart of FIG. 15, the stepped transmission is configured to be able to set six levels of gear stages (gear ratios) from first gear (1st) to sixth gear (6th). When the stepped transmission is sequentially upshifted from first gear, the drive torque of the vehicle Ve decreases at the timings of switching of the gear stage indicated by times t1, t2, t3, t4, and t5. As the drive torque decreases, the front-rear acceleration of the vehicle Ve decreases. Such fluctuations in the front-rear acceleration of the vehicle Ve constitute shift shock upon upshift. As indicated by line L1 in the time chart of FIG. 15, when the vehicle Ve travels in a "normal travel mode" in which the seat acceleration control in the embodiments of the present disclosure is not executed, the front-rear acceleration of the seat 4 (seat front-rear acceleration) fluctuates in conjunction with fluctuations in the drive torque and the front-rear acceleration of the vehicle Ve as described above.

However, when the vehicle Ve accelerates while traveling, executing the seat acceleration control in the embodiments of the present disclosure can change the seat front-rear acceleration according to the travel mode that is set so as to reflect the driving preference and intention of the driver. For example, as indicated by line L2 in the time chart of FIG. 15, when the vehicle Ve travels in the above-described "first sport travel mode," the seat acceleration control is executed so as to restrict the decrease in the seat front-rear acceleration upon upshift while maintaining the level of the maximum value of the seat front-rear acceleration immediately before upshift. Thus, in the "first sport travel mode," while the sensation of shift shock upon upshift is retained, the seat front-rear acceleration is increased on average compared with that in the case of the "normal travel mode" (without the seat acceleration control). Therefore, the driver and the passengers in the vehicle Ve can experience a dynamic or powerful acceleration feel suitable for the "first sport travel mode."

Figure 15:
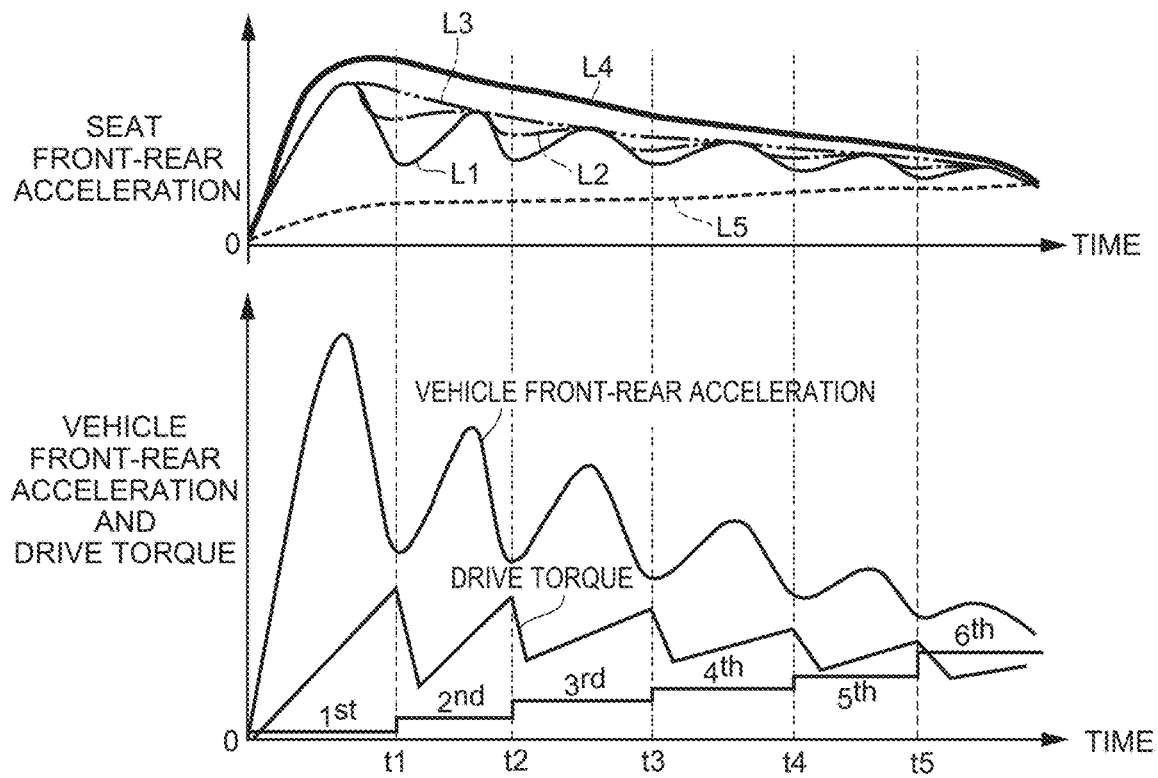
FIG. 15 is a time chart illustrating control contents of the "seat acceleration control" executed by the vehicle control device of the present disclosure, and showing fluctuations in a front-rear acceleration of the seat in a case where the "seat acceleration control" is executed in which, when the vehicle is operated so as to accelerate or the vehicle is operated so as to decelerate, the acceleration of the seat is changed according to shift shock of a stepped transmission with which the vehicle is actually equipped or a virtual stepped transmission.

As indicated by line L3 in the time chart of FIG. 15, when the vehicle Ve travels in the above-described "second sport travel mode," the seat acceleration control is executed so as to cancel out the decrease in the seat front-rear acceleration upon upshift while maintaining the level of the maximum value of the seat front-rear acceleration immediately before upshift. Thus, in the "second sport travel mode," shift shock upon upshift is reduced, and the seat front-rear acceleration is increased on average compared with that in the case of the "normal travel mode" (without the seat acceleration control). Therefore, the driver and the passengers in the vehicle Ve can experience a dynamic or powerful acceleration feel suitable for the "second sport travel mode." At the same time, they can experience an even acceleration feel without shift shock.

As indicated by line L4 in the time chart of FIG. 15, when the vehicle Ve travels in the above-described "aggressive travel mode," the seat acceleration control is executed so as to cancel out the decrease in the seat front-rear acceleration upon upshift as well as increase the level of the maximum value of the seat front-rear acceleration immediately before upshift. Thus, in the "aggressive travel mode," shift shock upon upshift is eliminated, and the seat front-rear acceleration is increased compared with that in the case of the "normal travel mode" (without the seat acceleration control), the "first sport travel mode," or the "second sport travel mode." Therefore, the driver and the passengers in the vehicle Ve can experience a more dynamic or more powerful acceleration feel suitable for the "aggressive travel mode." At the same time, they can experience an even acceleration feel without shift shock.

On the other hand, as indicated by line L5 in the time chart of FIG. 15, when the vehicle Ve travels in the above-described "soft travel mode," the seat acceleration control is executed such that the decrease in the seat front-rear acceleration upon upshift is canceled out and that the level of the maximum value of the seat front-rear acceleration immediately before upshift decreases significantly. Thus, in the "soft travel mode," shift shock upon upshift is eliminated, and the seat front-rear acceleration is reduced compared with that in the "normal travel mode" (without the seat acceleration control). Therefore, the driver and the passenger of the vehicle Ve can feel an even and smooth acceleration feel suitable for the "soft travel mode."

The vehicle control device in the embodiments of the present disclosure can produce virtual shift shock by applying the above-described seat acceleration control adapted to shift shock of a stepped transmission. That is, the vehicle Ve to be controlled in the embodiments of the present disclosure can assume that the vehicle Ve is virtually equipped with a stepped transmission with which the vehicle Ve is not actually equipped, and can virtually produce shift shock upon gear change of such a stepped transmission and behavior of the transmission. For example, the seat front-rear acceleration is changed by the seat acceleration control to thereby generate virtual vibration or shift and create shift shock that does not actually occur. Thus, when the vehicle Ve is not equipped with a transmission or is equipped with a continuously variable transmission, shift shock can be intentionally produced. Therefore, the vehicle control device in the embodiments of the present disclosure can control shift shock of the transmission according to the driving preference and intention of the driver.

When the vehicle Ve turns while traveling, the vehicle control device in the embodiments of the present disclosure executes the seat acceleration control according to the steering angle. Specifically, when the vehicle Ve is steered, the vehicle control device in the embodiments of the present disclosure changes the acceleration of the seat 4 in the left-right direction of the vehicle Ve (the seat lateral acceleration). For example, as shown in the time chart of FIG. 16, when a left turn in which the steering angle increases leftward and a right turn in which the steering angle increases rightward are alternately repeated, seat lateral accelerations corresponding to the steering angles occur. As indicated by line L11 in the time chart of FIG. 16, when the vehicle Ve travels in the "normal travel mode" in which the seat acceleration control in the embodiments of the present disclosure is not executed, a rightward seat lateral acceleration occurs when the vehicle turns left and a leftward seat lateral acceleration occurs when the vehicle turns right.

However, when the vehicle Ve turns while traveling, executing the seat acceleration control in the embodiments of the present disclosure can change the seat lateral acceleration according to the travel mode that is set so as to reflect the driving preference and intention of the driver. For example, as indicated by line L12 in the time chart of FIG. 16, when the vehicle Ve travels in the "sport travel mode" (e.g., the above-described "first sport travel mode," "second sport travel mode," or "aggressive travel mode"), the seat lateral acceleration is increased compared with that in the case of the "normal travel mode" (without the seat acceleration control) such that the seat lateral acceleration increases quickly. That is, the seat acceleration control is executed such that the jerk of the seat lateral acceleration becomes higher than that in the case of the "normal travel mode." In this case, as for the maximum value of the seat lateral acceleration, the level of the seat lateral acceleration occurring in the case of the "normal travel mode" is maintained. Or the seat lateral acceleration is controlled within an appropriate range of acceleration in which no problem with the steering or safety of the vehicle Ve arises. In the embodiment shown in FIG. 16, guards for the seat lateral acceleration indicated by line Lg are set, and the seat lateral acceleration is controlled within the range of these guards. The guards of the seat lateral acceleration are set according to the steering angle of the vehicle Ve as an upper limit value of the lateral acceleration below which no problem with the steering and safety of the vehicle Ve arises.

Figure 16:
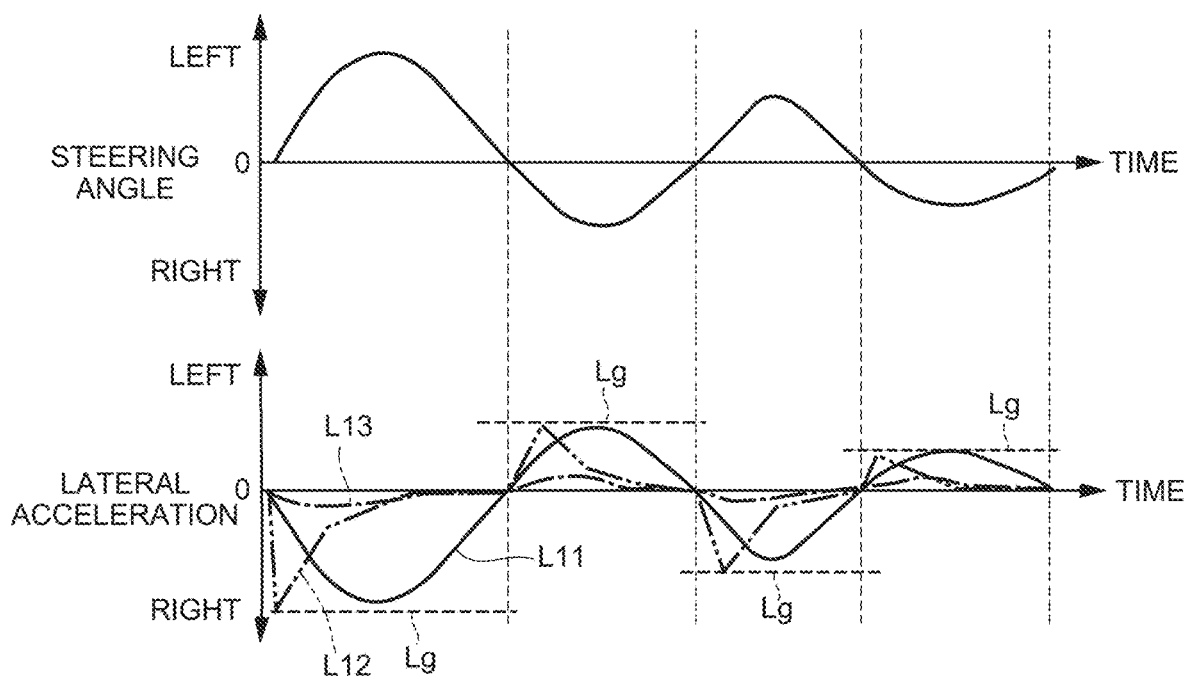
FIG. 16 is a time chart illustrating control contents of the "seat acceleration control" executed by the vehicle control device of the present disclosure, and showing fluctuations in a lateral acceleration of the seat in a case where the "seat acceleration control" is executed in which, when the vehicle is steered, the acceleration of the seat is changed according to a travel mode that reflects the driving preference of the driver.

On the other hand, for example, as indicated by line L13 in the time chart of FIG. 16, when the vehicle Ve travels in the "soft travel mode," the seat lateral acceleration is restricted compared with that in the case of the "normal travel mode" (without the seat acceleration control). That is, the seat acceleration control is executed such that a seat lateral acceleration is prevented from occurring as much as possible compared with the case of the "normal travel mode."

Thus, executing the seat acceleration control according to the steering angle as described above can create or produce a seat lateral acceleration according to the state of steering by the driver. Therefore, when the vehicle Ve turns while traveling, the driver and the passengers on the seats 4 can experience an appropriate steering feel corresponding to the travel mode that reflects the driving preference and intention of the driver.

Figure 17:
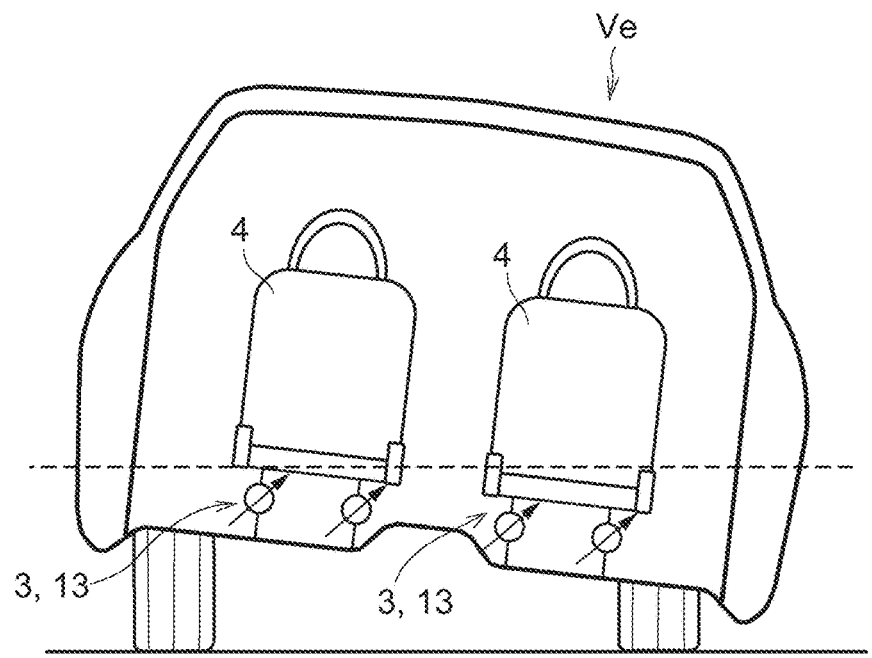
FIG. 17 is a view illustrating control contents of the "seat acceleration control" executed by the vehicle control device of the present disclosure, and is a view showing a state where, when the vehicle is steered, the posture of the vehicle inclines toward an outside of a clearance circle due to a roll, and showing, as a comparative example, the postures of the vehicle and the seats in a case where the "seat acceleration control" of the present disclosure is not executed.
Figure 18:
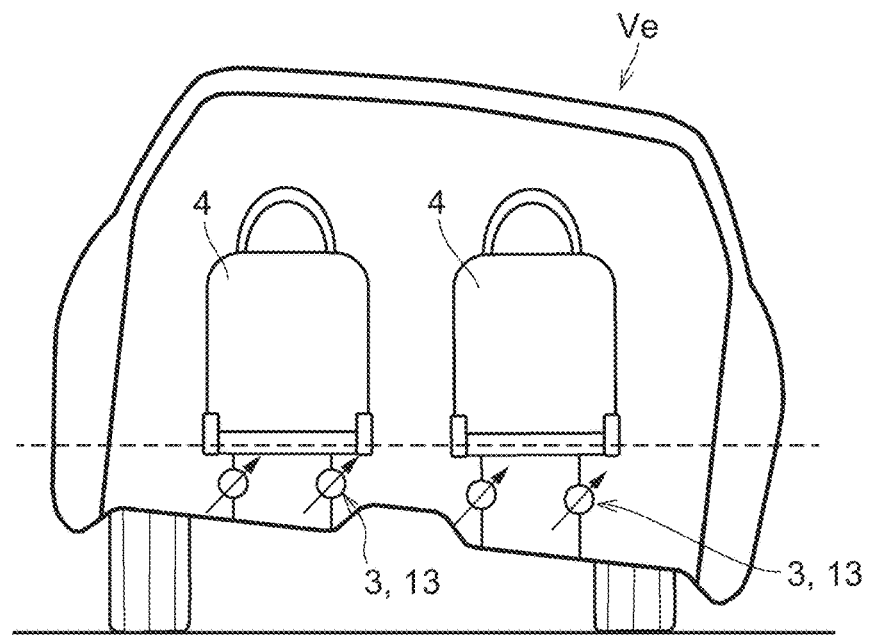
FIG. 18 is a view illustrating control contents of the "seat acceleration control" executed by the vehicle control device of the present disclosure, and is a view showing a state where, when the vehicle is steered, the posture of the vehicle inclines toward the outside of the clearance circle due to a roll, and showing the postures of the vehicle and the seats in a case where the "seat acceleration control" of the present disclosure is executed.

When the vehicle Ve turns while traveling, the vehicle control device in the embodiments of the present disclosure executes the seat acceleration control according to the posture of the vehicle Ve. Specifically, when the vehicle Ve is steered and the vehicle Ve rolls, the vehicle control device in the embodiments of the present disclosure changes the acceleration of the seat 4 (the seat front-rear acceleration and the seat lateral acceleration) so as to restrict the shift of the seat 4 due to the roll. Normally, when the vehicle Ve turns while traveling, a centrifugal force acts on the vehicle body, so that the vehicle Ve inclines toward an outside of a clearance circle as shown in FIG. 17 and FIG. 18. That is, the vehicle Ve is subjected to a roll. As shown in FIG. 17, when the seat acceleration control in the embodiments of the present disclosure is not executed, the seats 4 also incline toward the outside of the clearance circle as the vehicle Ve rolls. As a result, the postures of the driver and the passengers on the seats 4 also incline toward the outside of the clearance circle along with the seats 4.

However, when the vehicle Ve turns while traveling, executing the seat acceleration control in the embodiments of the present disclosure can change the acceleration of the seats 4 so as to keep the postures of the driver and the passengers constant. For example, as shown in FIG. 18, the seat acceleration control is executed so as to oppose the inclination direction of the vehicle Ve and prevent the seats 4 from shifting. Specifically, the seat suspensions 3 are controlled so as to prevent the seats 4 from shifting. Or each of the seat suspensions 3 and the seat actuators 13 is controlled. Thus, even when the vehicle Ve turns while traveling and rolls in the process, the shift of the seats 4 can be restricted to keep the postures of the driver and the passengers on the seats 4 constant. In particular, keeping the posture of the drive constant can improve the visibility and the safety of the driver during steering.

When executing the seat acceleration control according to a roll of the vehicle Ve as described above, the vehicle suspensions 2 are basically set toward improving the steering stability performance of the vehicle Ve, i.e., toward hardening the vehicle suspensions 2. Or when the vehicle suspensions 15 that are so-called "active suspensions" are used, the vehicle suspensions 15 are basically controlled toward improving the steering stability performance of the vehicle Ve, i.e., toward hardening the vehicle suspensions 15. The vehicle suspensions 15 may be controlled based on the vehicle information, and the seat suspensions 3 and the vehicle suspensions 15 may be controlled in a coordinated manner so as to suite the selected travel mode or according to the determined driving preference. Or the seat suspensions 3 and the seat actuators 13, and the vehicle suspensions 15 may be controlled in a coordinated manner.

The basic steering stability performance of the vehicle Ve is secured by the setting of the vehicle suspensions 2 or the control of the vehicle suspensions 15 as described above. At the same time, the ride comfort performance and the steering stability performance of the vehicle Ve allowing for high visibility and safety for the driver can be delivered by the seat acceleration control according to a roll of the vehicle Ve as described above. Therefore, the vehicle control device in the embodiments of the present disclosure can make the mutually contradictory vehicle characteristics of the ride comfort performance and the steering stability performance of the vehicle Ve compatible with each other.

Figure 19:
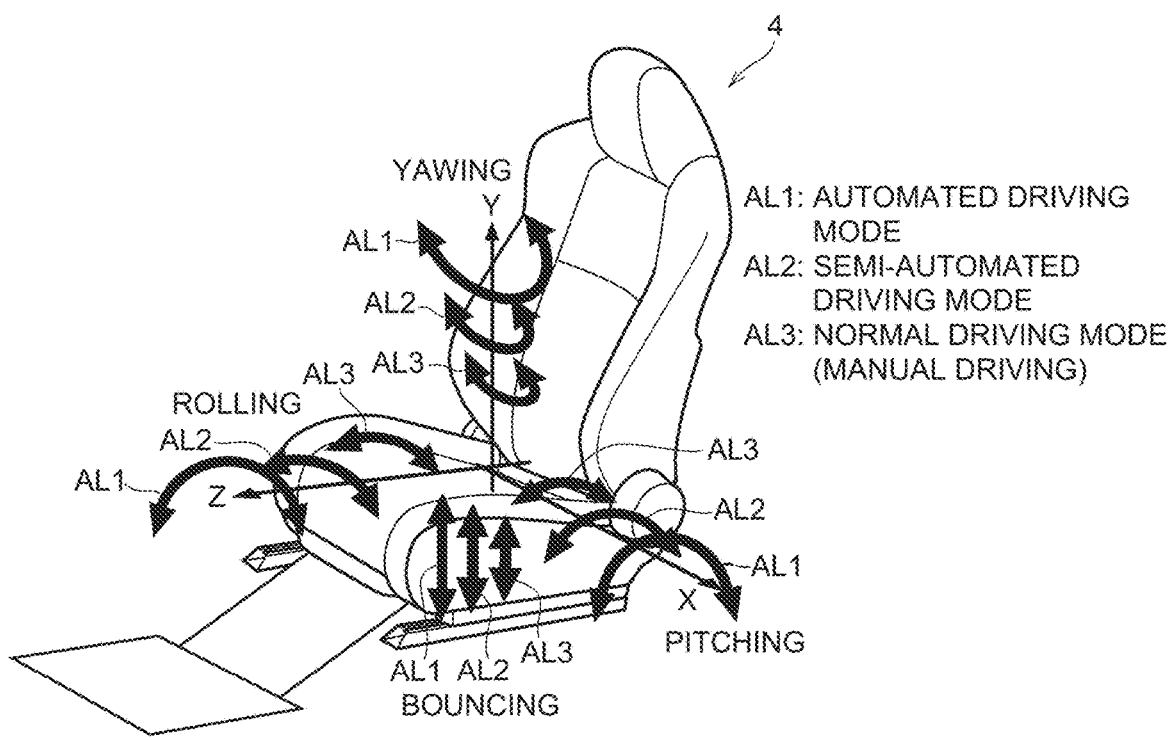
FIG. 19 is a view illustrating control contents of the "seat acceleration control" executed by the vehicle control device of the present disclosure, and showing an example in which, when the vehicle can perform multiple levels of "automated driving," a control amount for changing the acceleration of the seat by the "seat acceleration control" is set according to the level of "automated driving"

For the vehicle Ve to be controlled that is capable of multiple levels of "automated driving," the vehicle control device in the embodiments of the present disclosure executes the seat acceleration control according to the level of "automated driving." Specifically, the vehicle control device in the embodiments of the present disclosure sets the control amount for changing the acceleration of the seat 4 in the seat acceleration control according to the level of "automated driving." For example, as shown in FIG. 19, the vehicle Ve can travel while selectively switching among three levels of "automated driving modes," namely, a "normal driving mode," a "semi-automated driving mode," and an "automated driving mode," as the driving modes relating to the levels of "automated driving." The "normal driving mode" (or a manual driving mode) is a driving mode in which all of the acceleration operation, deceleration operation, and steering of the vehicle Ve are performed by the driver. By contrast, the "automated driving mode" is a driving mode in which at least one of the acceleration operation, deceleration operation, and steering of the vehicle Ve is automatically controlled. For example, in the "automated driving mode" in the embodiments of the present disclosure, all of the acceleration operation, deceleration operation, and steering are automatically controlled. The "semi-automated driving mode" is an intermediate driving mode between the "normal driving mode" and the "automated driving mode." For example, in the "semi-automated driving mode" in the embodiments of the present disclosure, the acceleration operation and the deceleration operation are automatically controlled. These three levels of driving modes are, for example, automatically selected and set by control according to the driving preference of the driver determined based on the vehicle information. Or these driving modes are manually selected and set, for example, by selection means operated by the driver, such as a selection switch (not shown) or a touch sensor (not shown).

Further, the vehicle control device in the embodiments of the present disclosure sets, for each of the driving modes as described above, a control amount for changing the acceleration of the seat 4 (at least one of the seat front-rear acceleration, the seat lateral acceleration, and the seat up-down acceleration). In the embodiment shown in FIG. 19, a control amount for rotary motion around an X-axis (pitching), a control amount for rotary motion around a Y-axis (yawing), a control amount for rotary motion around a Z-axis (rolling), and a control amount for upward and downward motion in a Y-axis direction (bouncing) are set. The control amounts are made smaller when the "normal driving mode" (manual driving mode) is selected than when the "automated driving mode" is selected. For example, the shift amount and the shift speed for shifting the seat 4 are made smaller and lower. In the embodiment shown in FIG. 19, as an image is indicated by arrow AL1, arrow AL2, and arrow AL3 in FIG. 19, when the "normal driving mode" is selected, the seat acceleration control is executed with the control amounts made smaller than when the "semi-automated driving mode" is selected. Further, when the "semi-automated driving mode" is selected, the seat acceleration control is executed with the control amounts made smaller than when the "automated driving mode" is selected.

When the driver steers the vehicle Ve by himself or herself in the "normal driving mode" (manual driving mode), the control amounts relative to a change in the acceleration of the seat 4 by the seat acceleration control as described above are reduced to make the driver aware of a situation where the vehicle's behavior is limited. In other words, the degree of intervention by control is reduced. Thus, in a situation where the vehicle's behavior approaches its limit, the driver can be alerted, so that the driver can transition the vehicle Ve to a safe travel state early. Further, when a situation where the vehicle's behavior approaches its limit in the "semi-automated driving mode" arises, the driver can be made aware of and alerted to such a situation, so that the driver can transition the vehicle Ve to a safe travel state early. Therefore, the vehicle control device in the embodiments of the present disclosure can improve the safety performance of the vehicle Ve that can perform "automated driving" or "semi-automated driving."

For the vehicle Ve to be controlled that is equipped with a collision detection device, the vehicle control device in the embodiments of the present disclosure executes the seat acceleration control when the collision detection device detects a collision. The collision detection device detects a collision between the vehicle Ve and an external object (e.g., another vehicle, a building, an obstacle, or a person). In this case, a collision is a situation where the vehicle Ve hits an external object or a situation where the vehicle Ve gets hit by an external object. Detecting a collision means predicting a collision immediately before it occurs or detecting a collision the moment it occurs. The collision detection device is formed by, for example, the vehicle front-rear acceleration sensor 5a, the vehicle lateral acceleration sensor 5b, the controller 6, etc. as described above. Further, the collision detection device is formed by the camera 5o, the laser sensor 5p, and the navigation system as described above that detect or sense look-ahead information on the surroundings of the vehicle Ve, the look-ahead detection controller 6c, etc.

When the collision detection device detects a collision, the vehicle control device in the embodiments of the present disclosure executes the seat acceleration control. Specifically, the vehicle control device in the embodiments of the present disclosure controls the seat suspensions 3 so as to shift the seat 4 in such a direction that the impact of the collision is mitigated. Or each of the seat suspensions 3 and the seat actuators 13 is controlled. For example, at least one of the seat suspensions 3 and the seat actuators 13 is controlled such that an acceleration in the opposite phase from the acceleration of the seat 4 resulting from the impact of the collision occurs.

Figure 20:
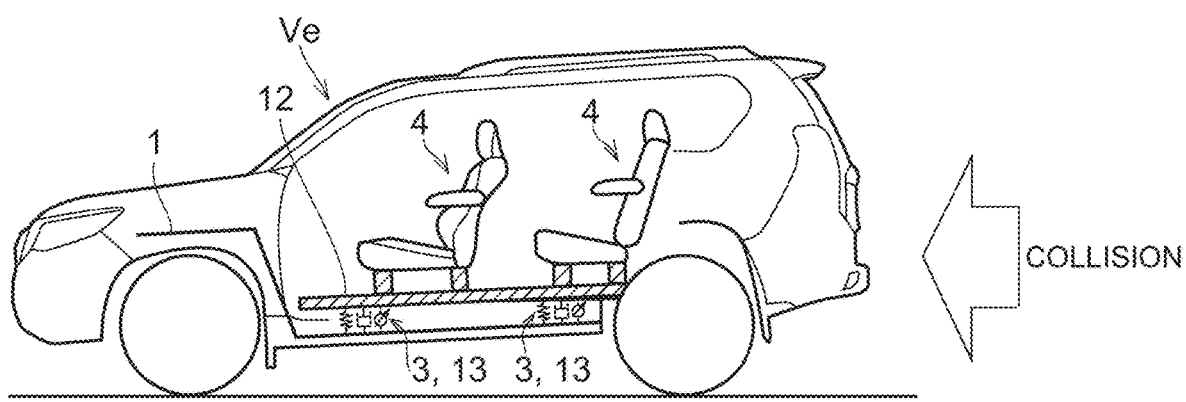
FIG. 20 is a view illustrating control contents of the "seat acceleration control" executed by the vehicle control device of the present disclosure, and is a view showing changes in the postures of the vehicle and the seats when the vehicle gets hit, and showing, as a comparative example, the postures of the vehicle and the seats in the case where the "seat acceleration control" of the present disclosure is not executed.

For example, as shown in FIG. 20, when the seat acceleration control in the embodiments of the present disclosure is not executed, in the event that the vehicle Ve gets hit from the rear side, the posture of the vehicle Ve inclines due to the impact of the collision such that a front-wheel side of the vehicle Ve sags. Accordingly, the postures of the seats 4 also incline such that a front-wheel side sags. In the embodiment shown in FIG. 20, the postures of the seats 4 and the floor member 12 also incline such that a front-wheel side sags down. Therefore, the driver and the passengers on the seats 4 are subjected to a significant acceleration (impact) toward the front side of the vehicle Ve.

Figure 21:
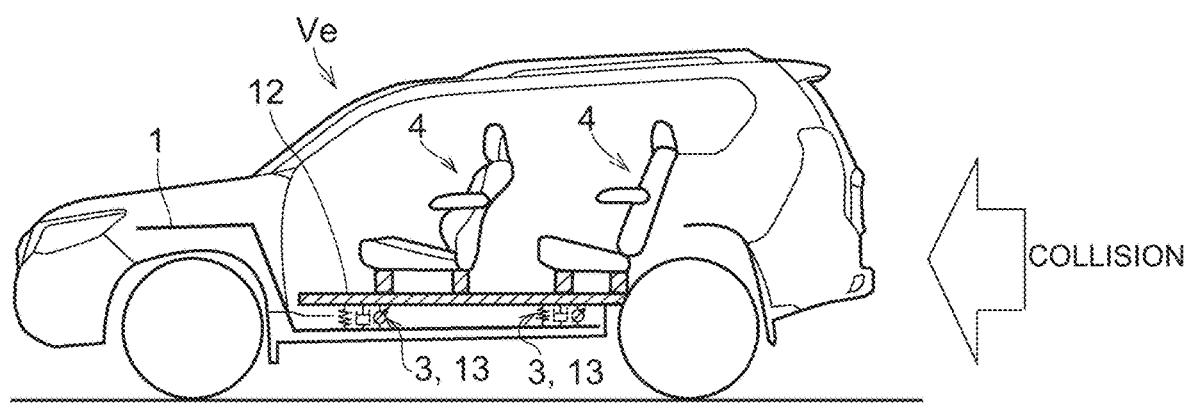
FIG. 21 is a view illustrating control contents of the "seat acceleration control" executed by the vehicle control device of the present disclosure, and is a view showing changes in the postures of the vehicle and the seats when the vehicle gets hit, and showing the postures of the vehicle and the seats in the case where the "seat acceleration control" of the present disclosure is executed.

However, in the event of a collision between the vehicle Ve and an external object, executing the seat acceleration control in the embodiments of the present disclosure can change the acceleration of the seats 4 so as to mitigate the impact on the driver and the passengers. For example, as shown in FIG. 21, the seat acceleration control is executed so as to oppose the inclination direction of the vehicle Ve in the collision and prevent the seats 4 from shifting. In the embodiment shown in FIG. 21, the seat acceleration control is executed so as to oppose the inclination direction of the vehicle Ve in the collision and prevent the seats 4 and the floor member 12 from shifting. Specifically, the seat suspensions 3 are controlled so as to prevent the seats 4 and the floor member 12 from shifting. Or each of the seat suspensions 3 and the seat actuators 13 is controlled. Therefore, even when the vehicle Ve and an external object collide with each other, the impact force exerted on the driver and the passengers on the seats 4 can be mitigated.

In the embodiment shown in FIG. 20 and FIG. 21, the example in which the vehicle Ve gets hit by an external object from the rear side of the vehicle Ve is shown. However, the seat acceleration control according to a collision of the vehicle Ve as described above can be executed also in such cases as where the vehicle Ve gets hit by an external object from the front side of the vehicle Ve, or the vehicle Ve gets hit by an external object from a lateral side of the vehicle Ve, or the vehicle Ve hits an external object on the front side of the vehicle Ve, or the vehicle Ve hits an external object on the rear side of the vehicle Ve.

Therefore, even when the vehicle Ve gets hit by an external object or the vehicle Ve hits an external object, the vehicle control device in the embodiments of the present disclosure can lessen the impact of the collision to protect the driver and the passengers in the vehicle Ve.

What is claimed is:

1. A control device of a vehicle including a vehicle suspension that is provided between an axle and a chassis of the vehicle and restricts and damps vibration, a seat suspension that is provided between the chassis and a seat and has a seat spring to restrict the vibration and a seat damper to damp the vibration and that is configured such that each of a spring constant of the seat spring and a damping coefficient of the seat damper is changeable and controllable, and a detection unit that detects vehicle information relating to a travel state of the vehicle and a state of operation by a driver, the control device comprising a controller that controls the seat suspension based on the vehicle information, wherein:

the detection unit detects, as the vehicle information, a vehicle speed, an acceleration of the vehicle, a state of acceleration operation by the driver, a state of deceleration operation by the driver, and a state of steering by the driver;

the controller determines, based on the vehicle information detected by the detection unit, whether the driver has driving preference of emphasizing steering stability performance of the vehicle or driving preference of emphasizing ride comfort performance of the vehicle; and according to the determined driving preference, the controller changes an acceleration of the seat by controlling the seat suspension, wherein the controller makes the acceleration of the seat higher when the controller determines that the driver has driving preference of emphasizing the steering stability performance more than the ride comfort performance than when the controller determines that the driver has driving preference of emphasizing the ride comfort performance more than the steering stability performance.

2. The control device of a vehicle according to claim 1, wherein:

the vehicle further includes:
a seat actuator that shifts the seat in at least one of a front-rear direction, a left-right direction, and an up-down direction; and
a power source that drives the seat actuator;

the controller controls the power source and the seat actuator based on the vehicle information; and according to the determined driving preference, the controller changes the acceleration of the seat by controlling at least one of the seat suspension and the seat actuator.

3. The control device of a vehicle according to claim 2, wherein:

the vehicle suspension is provided between the axle and the chassis and has a vehicle spring to restrict the vibration and a vehicle damper to damp the vibration;

the vehicle spring and the vehicle damper are configured such that each of a spring constant of the vehicle spring and a damping coefficient of the vehicle damper is changeable and controllable;

the controller controls the vehicle suspension based on the vehicle information; and according to the determined driving preference, the controller controls the vehicle suspension and at least one of the seat suspension and the seat actuator in a coordinated manner.

4. The control device of a vehicle according to claim 3, wherein:

the vehicle includes, as a drive power source, a motor capable of regenerative control during deceleration travel; and during deceleration travel, the controller controls the vehicle suspension so as to change each of the spring constant of the vehicle spring and the damping coefficient of the vehicle damper in such a direction that a ground contact load of a tire increases.

5. The control device of a vehicle according to claim 2, wherein:

the vehicle includes a collision detection device that detects a collision between the vehicle and an external object; and when the collision is detected, the controller controls at least one of the seat suspension and the seat actuator so as to shift the seat in such a direction that impact of the collision is mitigated.

6. The control device of a vehicle according to claim 1, wherein:

the vehicle suspension is provided between the axle and the chassis and has a vehicle spring to restrict the vibration and a vehicle damper to damp the vibration;

the vehicle spring and the vehicle damper are configured such that each of a spring constant of the vehicle spring and a damping coefficient of the vehicle damper is changeable and controllable;

the controller controls the vehicle suspension based on the vehicle information; and the controller controls the seat suspension and the vehicle suspension in a coordinated manner according to the determined driving preference.

7. The control device of a vehicle according to claim 6, wherein:

the vehicle includes, as a drive power source, a motor capable of regenerative control during deceleration travel; and during deceleration travel, the controller controls the vehicle suspension so as to change each of the spring constant of the vehicle spring and the damping coefficient of the vehicle damper in such a direction that a ground contact load of a tire increases.

8. The control device of a vehicle according to claim 1, wherein the controller changes the acceleration of the seat according to shift shock of a stepped transmission with which the vehicle is actually equipped or a virtual stepped transmission.

9. The control device of a vehicle according to claim 1, wherein the controller changes the acceleration of the seat in a front-rear direction of the vehicle when the vehicle is operated so as to accelerate or when the vehicle is operated so as to decelerate.

10. The control device of a vehicle according to claim 1, wherein the controller changes the acceleration of the seat in a left-right direction of the vehicle when the vehicle is steered.

11. The control device of a vehicle according to claim 1, wherein:

the vehicle is able to travel while selectively switching between at least two travel modes: one is a sport travel mode in which travel characteristics that emphasize the steering stability performance more than the ride comfort performance are set, and the other is a soft travel mode in which travel characteristics that emphasize the ride comfort performance more than the steering stability performance are set; and the controller makes the acceleration of the seat higher when the sport travel mode is selected than when the soft travel mode is selected.

12. The control device of a vehicle according to claim 1, wherein:

the vehicle is able to travel while selectively switching between at least two driving modes: one is a manual driving mode in which the driver performs all of the acceleration operation, the deceleration operation, and the steering, and the other is an automated driving mode in which at least one of the acceleration operation, the deceleration operation, and the steering is automatically controlled;

the controller sets, for each of the driving modes, a control amount for changing the acceleration of the seat; and the controller makes the control amount smaller when the manual driving mode is selected than when the automated driving mode is selected.

13. The control device of a vehicle according to claim 1, wherein:

the vehicle has a plurality of seats that is formed as separate seats; and the seat suspension is provided for each of the seats, between the chassis and the seat.

14. The control device of a vehicle according to claim 1, wherein:

the vehicle has a plurality of seats that is formed as separate seats and a one-piece floor member to which each of the seats is fixed; and the seat suspension is provided between the chassis and the floor member.

15. The control device of a vehicle according to claim 1, wherein:

the vehicle includes a collision detection device that detects a collision between the vehicle and an external object; and when the collision is detected, the controller controls the seat suspension so as to shift the seat in such a direction that impact of the collision is mitigated.

16. A control device of a vehicle including a vehicle suspension that is provided between an axle and a chassis of the vehicle and restricts and damps vibration, a seat suspension that is provided between the chassis and a seat and has a seat spring to restrict the vibration and a seat damper to damp the vibration and that is configured such that each of a spring constant of the seat spring and a damping coefficient of the seat damper is changeable and controllable, and a detection unit that detects vehicle information relating to a travel state of the vehicle and a state of operation by a driver, the control device comprising a controller that controls the seat suspension based on the vehicle information, wherein:

the detection unit detects, as the vehicle information, a vehicle speed, an acceleration of the vehicle, a state of acceleration operation by the driver, a state of deceleration operation by the driver, and a state of steering by the driver;

the controller determines, based on the vehicle information detected by the detection unit, whether the driver has driving preference of emphasizing steering stability performance of the vehicle or driving preference of emphasizing ride comfort performance of the vehicle; and according to the determined driving preference, the controller changes an acceleration of the seat by controlling the seat suspension, wherein the controller changes the acceleration of the seat in a left-right direction of the vehicle when the vehicle is steered.

17. A control device of a vehicle including a vehicle suspension that is provided between an axle and a chassis of the vehicle and restricts and damps vibration, a seat suspension that is provided between the chassis and a seat and has a seat spring to restrict the vibration and a seat damper to damp the vibration and that is configured such that each of a spring constant of the seat spring and a damping coefficient of the seat damper is changeable and controllable, and a detection unit that detects vehicle information relating to a travel state of the vehicle and a state of operation by a driver, the control device comprising a controller that controls the seat suspension based on the vehicle information, wherein:

the detection unit detects, as the vehicle information, a vehicle speed, an acceleration of the vehicle, a state of acceleration operation by the driver, a state of deceleration operation by the driver, and a state of steering by the driver;

the controller determines, based on the vehicle information detected by the detection unit, whether the driver has driving preference of emphasizing steering stability performance of the vehicle or driving preference of emphasizing ride comfort performance of the vehicle; and according to the determined driving preference, the controller changes an acceleration of the seat by controlling the seat suspension, wherein:

the vehicle is able to travel while selectively switching between at least two driving modes: one is a manual driving mode in which the driver performs all of the acceleration operation, the deceleration operation, and the steering, and the other is an automated driving mode in which at least one of the acceleration operation, the deceleration operation, and the steering is automatically controlled;

the controller sets, for each of the driving modes, a control amount for changing the acceleration of the seat; and the controller makes the control amount smaller when the manual driving mode is selected than when the automated driving mode is selected.

* * * * *